United States Patent
Zhang et al.

(10) Patent No.: US 12,386,652 B2
(45) Date of Patent: Aug. 12, 2025

(54) THREAD MANAGEMENT METHOD AND APPARATUS BASED ON AN OPERATING SYSTEM LOAD

(71) Applicant: Huawei Technologies Co., Ltd., Shenzhen (CN)

(72) Inventors: Xianfeng Zhang, Beijing (CN); Zaishang Wang, Beijing (CN); Fei Sun, Hangzhou (CN); Jixiao Han, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 363 days.

(21) Appl. No.: 17/918,515

(22) PCT Filed: Apr. 7, 2021

(86) PCT No.: PCT/CN2021/085817
§ 371 (c)(1),
(2) Date: Oct. 12, 2022

(87) PCT Pub. No.: WO2021/208786
PCT Pub. Date: Oct. 21, 2021

(65) Prior Publication Data
US 2023/0147786 A1    May 11, 2023

(30) Foreign Application Priority Data
Apr. 13, 2020 (CN) .......................... 202010286426.3

(51) Int. Cl.
*G06F 9/48* (2006.01)
(52) U.S. Cl.
CPC .......... *G06F 9/4831* (2013.01); *G06F 9/4881* (2013.01)

(58) Field of Classification Search
None
See application file for complete search history.

(56) References Cited

U.S. PATENT DOCUMENTS

| 6,658,448 | B1 * | 12/2003 | Stefaniak | G06F 9/5033 718/100 |
| 7,313,098 | B2 * | 12/2007 | Bearden | H04L 65/80 709/227 |
| 2012/0066683 | A1 | 3/2012 | Srinath | |

(Continued)

FOREIGN PATENT DOCUMENTS

| CN | 101116057 A | 1/2008 |
| CN | 102122252 A | 7/2011 |

(Continued)

OTHER PUBLICATIONS

Wikipedia, "Operating system-Wikipedia", Feb. 29, 2020, total 23 pages.

*Primary Examiner* — Adam Lee
(74) *Attorney, Agent, or Firm* — Conley Rose, P.C.

(57) ABSTRACT

In a thread management method, an application submits first information to an operating system through an API. The first information is used to indicate at least one first task to be executed by the application. The operating system allocates, by using the first information, the at least one first task to be executed by the application to a corresponding first task queue, and allocates a thread to the first task queue based on a current load level of the operating system and a type of the first task queue.

20 Claims, 8 Drawing Sheets

(56) References Cited

U.S. PATENT DOCUMENTS

| | | |
|---|---|---|
| 2012/0131309 A1 | 5/2012 | Johnson et al. |
| 2014/0013330 A1* | 1/2014 | Wang .................. G06F 9/524 |
| | | 718/103 |
| 2014/0189713 A1 | 7/2014 | Ben-Kiki et al. |
| 2015/0095914 A1 | 4/2015 | Mei et al. |
| 2015/0135183 A1 | 5/2015 | Kipp |

FOREIGN PATENT DOCUMENTS

| | | |
|---|---|---|
| CN | 102331923 A | 1/2012 |
| CN | 102360310 A | 2/2012 |
| CN | 103593166 A | 2/2014 |
| CN | 103605568 A | 2/2014 |
| CN | 105760234 A | 7/2016 |
| CN | 109558211 A | 4/2019 |
| CN | 109582455 A | 4/2019 |
| CN | 110609743 A | 12/2019 |

\* cited by examiner

THREAD MANAGEMENT METHOD AND APPARATUS BASED ON AN OPERATING SYSTEM LOAD

CROSS-REFERENCE TO RELATED APPLICATIONS

This is a national stage of International Patent Application No. PCT/CN2021/085817 filed on Apr. 7, 2021, which claims priority to Chinese Patent Application No. 202010286426.3 filed on Apr. 13, 2020. Both of the aforementioned applications are hereby incorporated by reference in their entireties.

TECHNICAL FIELD

This application relates to the field of operating system technologies, and specifically, to a thread management method and apparatus.

BACKGROUND

To meet diversified requirements of a user on an electronic device, a plurality of applications are usually installed on the electronic device, and each application may usually implement a plurality of functions, to meet the requirements of the user.

The application needs to execute a task corresponding to each function, to implement the function. To improve efficiency of executing a task by an application, currently, an operating system of the electronic device usually opens a concurrency capability. In a running process of the application, the operating system that opens the concurrency capability allows the application to create, depending on a task that needs to be executed by the application, each thread used to execute the task, and each thread created by the application executes a corresponding task.

However, in a research process of this application, an inventor finds that, when an application needs to execute a large quantity of tasks, the application usually creates a large quantity of threads, and consequently the application abuses the threads, causing burst of the quantity of threads. The burst of the quantity of threads usually increases load of an operating system and reduces running efficiency of the operating system.

SUMMARY

To resolve a problem of burst of a quantity of threads caused because an application creates a large quantity of threads in a thread management method applied in the conventional technology, embodiments of this application disclose a thread management method.

According to a first aspect, embodiments of this application disclose a thread management method. The method includes:

An operating system determines at least one piece of first information of an application. The first information is used to indicate a first task to be executed by the application.

The operating system allocates the at least one first task to a corresponding first task queue.

The operating system allocates a thread to the first task queue based on a current load level of the operating system and a type of the first task queue.

According to the solutions disclosed in embodiments of this application, the operating system can allocate a thread required by the application. In addition, in a process of allocating the thread, the operating system considers a load level of the operating system to prevent the application from abusing the thread, avoid burst of a quantity of threads, and enable the operating system to run efficiently.

In an optional design, that the operating system allocates a thread to the first task queue based on a current load level of the operating system and a type of the first task queue includes:

The operating system determines a priority of the first task queue.

The operating system determines, based on the priority of the first task queue and a task type corresponding to an idle thread in a first thread pool, a first target task queue to which a thread can be allocated. The first thread pool includes an idle thread created by the operating system based on the current load level of the operating system.

The operating system allocates the idle thread in the first thread pool to the first target task queue based on a type of the first target task queue.

According to the foregoing steps, the operating system can allocate the idle thread in the first thread pool to the first task queue based on the priority of the first task queue, so that there is no need to temporarily create a thread for the first target task queue. Therefore, this solution can increase a speed at which the operating system allocates the thread to the application, and correspondingly increase a speed at which the application executes a task by using the thread, thereby bringing better experience to a user.

In an optional design, that the operating system allocates the idle thread in the first thread pool to the first target task queue based on a type of the first target task queue includes:

When the first target task queue includes a serial task queue, the operating system allocates an idle thread in the first thread pool to the serial task queue.

Alternatively, when the first target task queue includes a parallel task queue, the operating system allocates n idle threads in the first thread pool to the parallel task queue based on a quantity of tasks in the parallel task queue. A maximum value of n is a quantity of tasks included in the parallel task queue.

According to the foregoing steps, the operating system allocates the idle thread in the first thread pool to the serial task queue, so that the idle thread sequentially executes all tasks in the serial task queue, to reduce thread waste. In addition, the operating system may allocate the n idle threads to the parallel task queue, to improve processing efficiency of the parallel task queue.

In an optional design, the method further includes:

After at least one task in the first target task queue is completed, the operating system reclaims, to the first thread pool, a thread allocated to the first target task queue, or the operating system schedules, to another task queue, a thread allocated to the first target task queue, or the operating system destroys a thread allocated to the first target task queue.

According to the foregoing steps, the operating system may reclaim, schedule, and destroy a thread that completes a task, to reduce the thread waste and avoid the burst of the quantity of threads.

In an optional design, the method further includes:

When the operating system determines that the first task queue includes a second target task queue, and the first thread pool does not include a thread used to execute a task in the second target task queue, the operating system creates and allocates a corresponding thread to the second target task queue, or, the operating system supports the application in creating a corresponding thread for the second target task queue.

The second target task queue is a first task queue whose priority is higher than a first priority, and/or the second target task queue includes a target task.

According to the foregoing steps, when the first thread pool does not include the thread used to execute the task in the second target task queue, to ensure successful execution of the task in the second target task queue, the operating system may create and allocate the corresponding thread to the second target task queue, or support the application in creating the corresponding thread for the second target task queue, to successfully execute the task in the second target task queue.

In an optional design, that the operating system determines a priority of the first task queue includes:

The operating system determines the priority of the first task queue based on second information that is of the at least one first task and that is submitted by the application; and/or the operating system determines the priority of the first task queue based on third information of the application, where the third information includes at least one of the following: a running platform for the application, whether the application is currently visible, whether a function of the application is currently perceivable, and an application frequency of the application; and/or the operating system determines the priority of the first task queue based on a type of a task included in the first task queue; and/or the operating system determines the priority of the first task queue based on waiting duration of the first task queue.

According to the foregoing steps, the operating system can determine the priority of the first task queue based on the second information that is of the at least one first task and that is submitted by the application, the third information of the application, the type of the task included in the first task queue, and/or the waiting duration of the first task queue.

In an optional design, that the operating system determines the priority of the first task queue based on third information of the application includes:

When the third information includes the running platform for the application, the operating system determines that a priority of a first task queue of a first application is higher than a priority of a first task queue of a second application. A running platform for the first application is a foreground, and a running platform for the second application is a background.

When the third information includes whether the application is currently visible, the operating system determines that a priority of a first task queue of a third application is higher than a priority of a first task queue of a fourth application. The third application is currently visible, and the fourth application is currently invisible.

When the third information includes whether the function of the application is currently perceivable, the operating system determines that a priority of a first task queue of a fifth application is higher than a priority of a first task queue of a sixth application. A function of the fifth application is currently perceivable, and a function of the sixth application is not currently perceivable.

When the third information includes the application frequency of the application, the operating system determines that a priority of a first task queue of a seventh application is higher than a priority of a first task queue of an eighth application. An application frequency of the seventh application is higher than an application frequency of the eighth application.

In an optional design, the method further includes:

The operating system determines, in a first time period, at least one first application whose application frequency is higher than a first threshold.

The operating system determines, in the first time period, a target thread whose frequency is higher than a second threshold and that is applied by the first application.

The operating system determines, based on the current load level of the operating system, a quantity of target threads that can be supported, and generates a corresponding quantity of target threads. The target threads are located in the first thread pool.

According to the foregoing steps, the operating system may generate a thread in the first thread pool. In addition, the target thread generated by the operating system is a thread that is applied by the first application at a higher frequency, and the first application is an application with a higher application frequency on an electronic device. In this case, the thread generated by the operating system is a thread with a higher application frequency, so that the thread in the first thread pool can meet requirements in most scenarios.

In an optional design, the load level of the operating system is determined by using at least one of the following parameters: an idle percentage of a processor running the operating system, a quantity of currently created threads, memory usage of the processor, and a read/write status of a memory of an electronic device on which the operating system is installed.

In an optional design, the method further includes:

The operating system allocates at least one second task to be executed by the operating system to a corresponding second task queue.

The operating system determines a priority of the second task queue.

The operating system allocates an idle thread included in a second thread pool to the second task queue based on the priority of the second task queue. The idle thread included in the second thread pool is created by the operating system based on the current load level of the operating system.

According to a second aspect, embodiments of this application disclose a thread management method. The method includes:

When needing to execute a first task, an application submits first information to an operating system through a first application programming interface API corresponding to the first task. The first information is used to indicate the first task.

The application executes the first task by using a thread allocated by the operating system to the first task.

According to embodiments of this application, the user program does not need to create a thread for the first task, but the operating system allocates a thread required by the application, that is, the operating system allocates the thread for the first task to the user program, to prevent the application from abusing the thread, avoid burst of a quantity of threads, and enable the operating system to run efficiently.

In an optional design, the method further includes:

When the application does not obtain, in a first time period after the first information is submitted, the thread allocated by the operating system to the first task, the application transmits a first request to the operating system through a second API corresponding to the first task.

After obtaining a first feedback corresponding to the first request, the application generates a thread corresponding to the first task, and executes the first task by using the thread.

According to the foregoing steps, if the application does not obtain the thread allocated by the operating system to the task, the application may invoke the second API. After determining that the application invokes the second API, the operating system usually supports the application in generating the thread corresponding to the task, to avoid excessively long waiting time of the application.

In an optional design, the method further includes:

The application submits second information of the first task to the operating system through the first API corresponding to the first task. The second information is used to indicate a priority of the first task.

According to the foregoing step, the operating system may obtain the second information that is of the first task and that is submitted by the application, and determine, by using the second information, a priority of a task queue in which the first task is located.

According to a third aspect, embodiments of this application disclose a thread management apparatus. The apparatus includes:

a processor and an application programming interface API.

The API is configured to obtain at least one piece of first information of an application. The first information is used to indicate a first task to be executed by the application.

The processor is configured to: allocate the at least one first task to a corresponding first task queue; and allocate a thread to the first task queue based on a current load level of an operating system of the processor and a type of the first task queue.

In an optional design, the processor is specifically configured to: determine a priority of the first task queue;
  determine, based on the priority of the first task queue and a task type corresponding to an idle thread in a first thread pool, a first target task queue to which a thread can be allocated, where the first thread pool includes an idle thread created based on the current load level of the operating system; and
  allocate the idle thread in the first thread pool to the first target task queue based on a type of the first target task queue.

In an optional design, the processor is specifically configured to: when the first target task queue includes a serial task queue, allocate an idle thread in the first thread pool to the serial task queue; or
  when the first target task queue includes a parallel task queue, allocate n idle threads in the first thread pool to the parallel task queue based on a quantity of tasks in the parallel task queue, where a maximum value of n is a quantity of tasks included in the parallel task queue.

In an optional design, the processor is further configured to: after at least one task in the first target task queue is completed, reclaim, to the first thread pool, a thread allocated to the first target task queue, or schedule, to another task queue, a thread allocated to the first target task queue, or destroy a thread allocated to the first target task queue.

In an optional design, the processor is further configured to: when the first task queue includes a second target task queue, and the first thread pool does not include a thread used to execute a task in the second target task queue, create and allocate a corresponding thread to the second target task queue, or support the application in creating a corresponding thread for the second target task queue.

The second target task queue is a first task queue whose priority is higher than a first priority, and/or the second target task queue includes a target task.

In an optional design, the processor is configured to determine the priority of the first task queue based on second information that is of the at least one first task and that is submitted by the application; and/or
  the processor is configured to determine the priority of the first task queue based on third information of the application, where the third information includes at least one of the following: a running platform for the application, whether the application is currently visible, whether a function of the application is currently perceivable, and an application frequency of the application; and/or
  the processor is configured to determine the priority of the first task queue based on a type of a task included in the first task queue; and/or
  the processor is configured to determine the priority of the first task queue based on waiting duration of the first task queue.

In an optional design, when the third information includes the running platform for the application, the processor is configured to determine that a priority of a first task queue of a first application is higher than a priority of a first task queue of a second application. A running platform for the first application is a foreground, and a running platform for the second application is a background.

When the third information includes whether the application is currently visible, the processor is configured to determine that a priority of a first task queue of a third application is higher than a priority of a first task queue of a fourth application. The third application is currently visible, and the fourth application is currently invisible.

When the third information includes whether the function of the application is currently perceivable, the processor is configured to determine that a priority of a first task queue of a fifth application is higher than a priority of a first task queue of a sixth application. A function of the fifth application is currently perceivable, and a function of the sixth application is not currently perceivable.

When the third information includes the application frequency of the application, the processor is configured to determine that a priority of a first task queue of a seventh application is higher than a priority of a first task queue of an eighth application. An application frequency of the seventh application is higher than an application frequency of the eighth application.

In an optional design, the processor is further configured to: determine, in a first time period, at least one first application whose application frequency is higher than a first threshold;
  determine, in the first time period, a target thread whose frequency is higher than a second threshold and that is applied by the first application; and
  determine, based on the current load level of the operating system, a quantity of target threads that can be supported, and generate a corresponding quantity of target threads, where the target threads are located in the first thread pool.

In an optional design, the load level of the operating system is determined by using at least one of the following parameters: an idle percentage of a processor running the operating system, a quantity of currently created threads, memory usage of the processor, and a read/write status of a memory of an electronic device on which the operating system is installed.

In an optional design, the processor is further configured to: allocate at least one second task to be executed by the processor to a corresponding second task queue;

determine a priority of the second task queue; and allocate an idle thread included in a second thread pool to the second task queue based on the priority of the second task queue, where the idle thread included in the second thread pool is created by the operating system based on the current load level of the operating system.

According to a fourth aspect, embodiments of this application disclose a thread management apparatus. The apparatus includes:

a processor and a first application programming interface API.

When an application needs to execute a first task, the first API corresponding to the first task is configured to submit first information to an operating system. The first information is used to indicate the first task.

The processor is configured to execute the first task by using a thread allocated by the operating system to the first task.

In an optional design, the apparatus further includes:

a second API.

When the thread allocated by the operating system to the first task is not obtained in a first time period after the first information is submitted, the second API corresponding to the first task is configured to transmit a first request to the operating system.

The processor is further configured to generate a thread corresponding to the first task after a first feedback corresponding to the first request is obtained, and execute the first task by using the thread.

In an optional design, the processor is further configured to submit second information of the first task to the operating system through the first API corresponding to the first task. The second information is used to indicate a priority of the first task.

According to a fifth aspect, embodiments of this application disclose a terminal apparatus. The terminal apparatus includes:

at least one processor and a memory.

The memory is configured to store program instructions.

The processor is configured to invoke and execute the program instructions stored in the memory, to enable the terminal apparatus to perform the thread management method according to any of the first aspect.

According to a sixth aspect, embodiments of this application disclose a terminal apparatus. The terminal apparatus includes:

at least one processor and a memory.

The memory is configured to store program instructions.

The processor is configured to invoke and execute the program instructions stored in the memory, to enable the terminal apparatus to perform the thread management method according to any of the second aspect.

According to a seventh aspect, embodiments of this application disclose a computer-readable storage medium. The computer-readable storage medium stores instructions. When the instructions are run on a computer, the computer is enabled to perform the thread management method according to any of the first aspect.

According to an eighth aspect, embodiments of this application disclose a computer-readable storage medium. The computer-readable storage medium stores instructions. When the instructions are run on a computer, the computer is enabled to perform the thread management method according to any of the second aspect.

According to a ninth aspect, embodiments of this application disclose a computer program product including instructions. When the computer program product runs on an electronic device, the electronic device is enabled to perform all or some of the steps in an embodiment corresponding to the first aspect.

According to a tenth aspect, embodiments of this application disclose a computer program product including instructions. When the computer program product runs on an electronic device, the electronic device is enabled to perform all or some of the steps in an embodiment corresponding to the second aspect.

In the thread management method disclosed in embodiments of this application, an application may submit first information to an operating system through an API. The first information is used to indicate at least one first task to be executed by the application. The operating system allocates, by using the first information, the at least one first task to be executed by the application to a corresponding first task queue, and allocates a thread to the first task queue based on a current load level of the operating system and a type of the first task queue.

According to the solutions disclosed in embodiments of this application, the operating system can allocate a thread required by the application. In addition, in a process of allocating the thread, the operating system considers a load level of the operating system, to prevent the application from abusing the thread, avoid burst of a quantity of threads, and enable the operating system to run efficiently.

Further, in the solutions in embodiments of this application, an operating system may create a first thread pool based on a load level of the operating system. The first thread pool includes an idle thread created by the operating system based on a current load level of the operating system. When allocating the thread to the first task queue, the operating system allocates the idle thread in the first thread pool to the first task queue, to improve a speed of obtaining a required thread by the first task queue, and improve efficiency of executing a task by an application.

DESCRIPTION OF EMBODIMENTS

The following describes the technical solutions in embodiments of this application with reference to the accompanying drawings in embodiments of this application.

In the descriptions of embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions of embodiments of this application, "a plurality of" means two or more than two.

The following terms "first" and "second" are merely intended for a purpose of description. In the descriptions of embodiments of this application, "a plurality of" means two or more than two unless otherwise specified.

The thread management method disclosed in embodiments of this application may be applied to a plurality of electronic devices. In some embodiments, the electronic device may be a mobile phone, a tablet computer, a desktop type, a laptop type, a notebook computer, an ultra-mobile personal computer (Ultra-mobile Personal Computer, UMPC), a handheld computer, a netbook, a personal digital assistant (Personal Digital Assistant, PDA), a wearable electronic device, a smartwatch, or the like. A plurality of applications may be run on the electronic device. The applications may include an application pre-installed on the electronic device, or may be an application installed on the electronic device by a user based on a requirement of the user. For example, when the user needs to send or receive an email, the user may install an email-related application on the electronic device by using an application market or the like.

Figure 1:
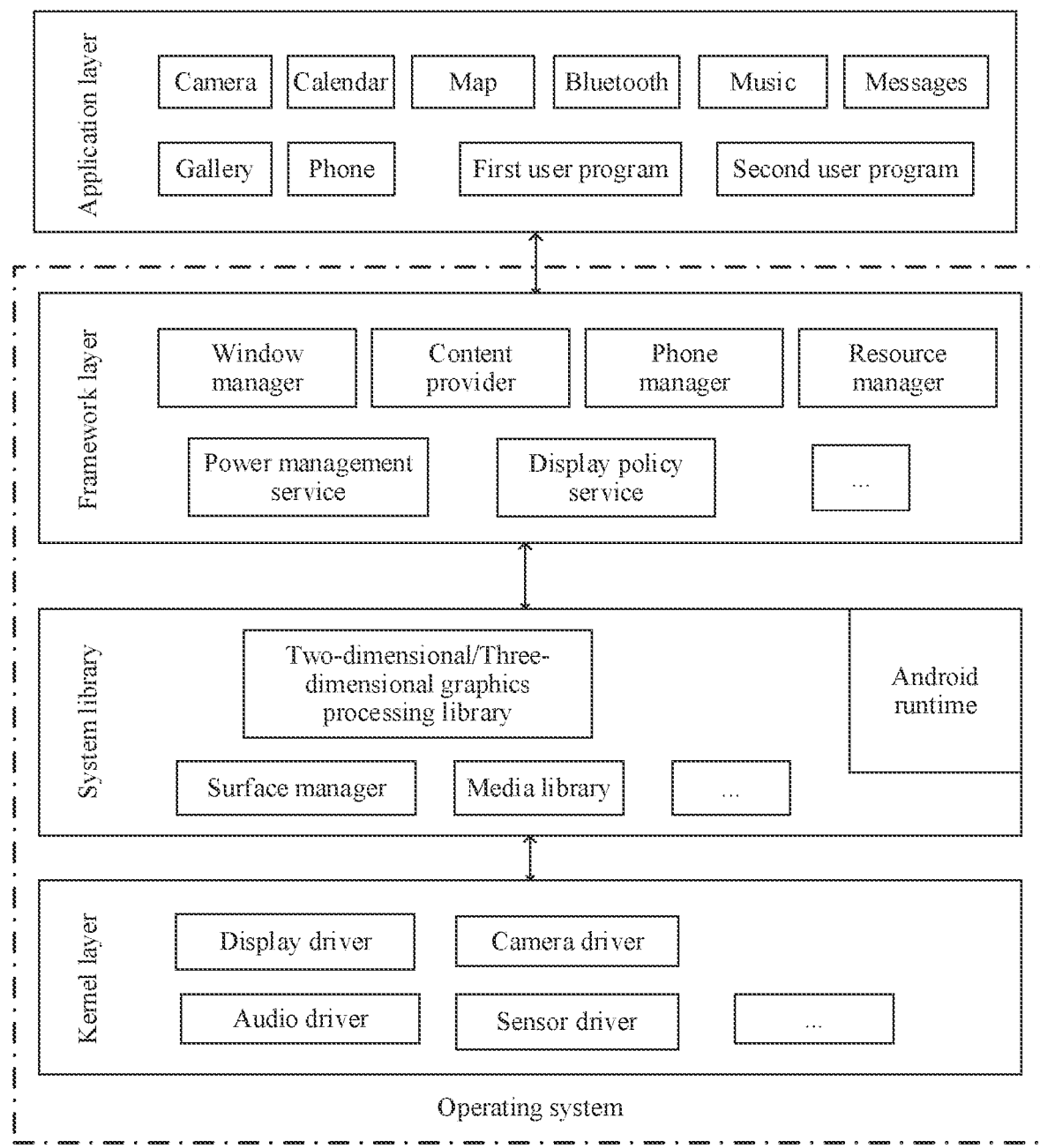
FIG. 1 is an example diagram of a block diagram of a software structure of an electronic device according to an embodiment of this application.

FIG. 1 is an example diagram of a block diagram of a software structure of an electronic device according to an embodiment of this application.

In a layered architecture, software of the electronic device is divided into several layers, and each layer has a clear role and task. The layers exchange data through a software interface. In some embodiments, an Android system is divided into four layers: an application layer, a framework layer, a system library, and a kernel layer from top to bottom. The framework layer, the system library, and the kernel layer jointly constitute an operating system of the electronic device.

The application layer may include a series of applications. The applications may include an application installed on the electronic device by default before delivery, and may further include an application installed by a user in a use process of the electronic device. As shown in FIG. 1, applications such as Camera, Gallery, Calendar, Phone, Map, Navigation, Bluetooth, Music, Videos, and Messages may be installed in the application layer. The application layer further includes applications installed by a user on an electronic device based on a use requirement of the user, for example, a first application and a second application included in FIG. 1. The first application and the second application may be a data interaction application, a shopping application, a music playback application, a game application, or the like. This is not limited in embodiments of this application.

The application in the application layer may usually execute a plurality of tasks. For example, the music playback application can not only play music selected by the user, but also collect preferences of the user, recommend corresponding music based on the preferences of the user, display music recommended by a friend of the user, and the like.

In addition, the application includes an application programming interface (application programming interface, API), and may exchange data with the operating system through the API.

The framework layer provides an API and a programming framework. The operating system may exchange data with the application in the application layer through the API. The framework layer includes some predefined functions.

As shown in FIG. 1, the framework layer may include a display policy service, a power management service (power manager service, PMS), and a display management service (display manager service, DMS). Certainly, the framework layer may further include an activity manager, a window manager, a content provider, a view system, a phone manager, a resource manager, a notification manager, and the like. This is not limited in embodiments of this application.

The system library usually includes a two-dimensional/three-dimensional graphics processing library, a surface manager, a media library, and the like. The kernel layer provides a driver, and the driver may include a display driver, a camera driver, an audio driver, a sensor driver, and the like.

It should be noted that, although embodiments of this application are described by using the Android system as an example, a basic principle in embodiments of this application is also applicable to an electronic device based on an operating system, for example, iOS or Windows.

One application may usually execute a plurality of tasks. To improve task execution efficiency of the application, the operating system of the electronic device usually opens a concurrency capability. The operating system that opens the concurrency capability supports the application in creating a plurality of threads at the same time, and separately executing corresponding tasks by using the plurality of threads, to improve the task execution efficiency of the application.

In the conventional technology, an application may create a corresponding thread depending on a task that needs to be executed by the application. A thread interface corresponding to each task is usually set in the application. When the application needs to execute a task, the application invokes a thread interface corresponding to the task. After determining that an application invokes a thread interface, an operating system that supports a concurrency capability allows the application to create a thread used to execute the task. In other words, in the conventional technology, a quantity of threads created by an application is determined by a task that needs to be executed by the application, and an operating system does not manage and control the threads created by the application.

In this case, in the conventional technology, when an application needs to execute a large quantity of tasks, the application usually creates a large quantity of threads, causing burst of the quantity of threads. The burst of the quantity of threads usually increases load of the operating system and reduces running efficiency of the operating system.

The following describes implementations of this embodiment in detail with reference to accompanying drawings.

To resolve a problem of burst of a quantity of threads caused because an application creates a large quantity of threads in a thread management method applied in the conventional technology, embodiments of this application disclose a thread management method.

Figure 2:
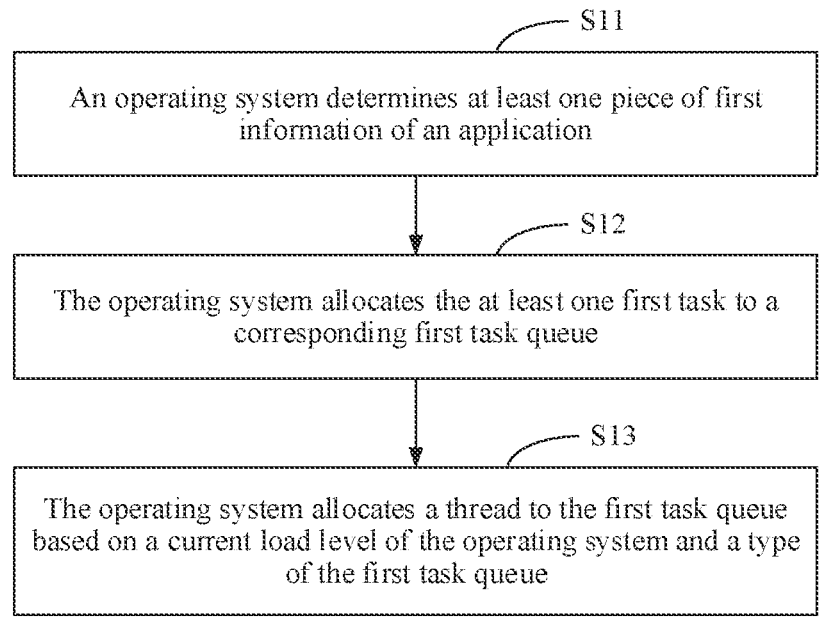
FIG. 2 is a schematic diagram of a working procedure of a thread management method according to an embodiment of this application.

Refer to a schematic diagram of a working procedure shown in FIG. 2. The thread management method disclosed in embodiments of this application includes the following steps.

Step S11: An operating system determines at least one piece of first information of an application. The first information is used to indicate a first task to be executed by the application.

Refer to the schematic diagram shown in FIG. 1. The application includes an API, and may exchange data with the operating system through the API. In this embodiment of this application, the application is provided with a first API used to submit the first information to the operating system, and may submit the first information to the operating system through the first API. In addition, a first API of the application is usually in a one-to-one correspondence with a task of the application, that is, one first API of the application is usually used to submit first information of one task to the operating system. When the application needs to execute a plurality of first tasks, the application may be configured with a plurality of first APIs, and submit first information of each first task to the operating system through the first API corresponding to the first task.

In this case, after obtaining the first information, the operating system may determine, based on the first information, the at least one first task to be executed by the application.

Step S12: The operating system allocates the at least one first task to a corresponding first task queue.

In this embodiment of this application, the operating system may pre-generate a plurality of types of first task queues, and allocate the first task to the corresponding first task queue.

For example, a type of the first task queue is classified according to a classification parameter, namely, whether there is time dependency between tasks. In this case, the type of the first task queue may include a serial task queue and a parallel task queue. Correspondingly, when allocating the first task, the operating system may determine, based on whether there is time dependency between first tasks, the first task queue corresponding to the first task.

For example, when there is a strong time dependency between a task A and a task B, that is, the task B can be executed only after the task A is executed, the operating system allocates the task A and the task B to the serial task queue. In addition, when there is no time dependency relationship between the task A and the task B, that is, the task A and the task B may be executed at the same time, or the other task may be executed after one task is executed, the operating system allocates the task A and the task B to the parallel task queue.

Alternatively, the operating system may classify the type of the first task queue according to a parameter, namely, content of a task. Correspondingly, after determining the first task, the operating system may allocate the first task to the corresponding task queue based on content of the first task.

For example, some applications need to update user interfaces (user interfaces, UIs) of the applications. In this case, the application needs to execute a UI update task. In this case, the operating system pre-creates a first task queue corresponding to the UI update task. After determining, by using the first information, that the first task to be executed by the application includes the UI update task, the operating system may allocate the UI update task to the first task queue corresponding to the UI update task.

Certainly, the operating system may further generate a first task queue of another type. Correspondingly, the operating system may further allocate the at least one first task to the first task queue of another type. In addition, the operating system may further classify the type of the first task queue by using at least two classification parameters. For example, the operating system classifies the first task queue jointly according to the two classification parameters, namely, whether there is time dependency between tasks and the content of the task. In this case, the operating system may simultaneously generate the serial task queue, the parallel task queue, and a queue corresponding to the content of the task. In addition, after determining the at least one first task, the operating system preferably allocates the first task to the queue corresponding to the content of the task, and then allocates remaining first tasks to the serial task queue and the parallel task queue.

Step S13: The operating system allocates a thread to the first task queue based on a current load level of the operating system and the type of the first task queue.

The type of the first task queue usually includes a serial task queue and a parallel task queue, and/or the type of the first task queue is determined based on content of a task included in the first task queue. For example, when the first task queue includes a UI update task, the type of the first task queue is of a UI update task queue.

The operating system allocates the thread to the first task queue based on the current load level of the operating system, that is, the operating system manages and controls a thread required by an application. In addition, when allocating a thread, the operating system considers a load level of the operating system. Therefore, the operating system usually allocates an appropriate thread to the first task queue w % ben successful running of the operating system can be ensured, to avoid burst of a quantity of threads and ensure successful running of the operating system.

In this embodiment of this application, the load level of the operating system may be determined by using at least one of the following parameters: an idle percentage of a processor running the operating system, a quantity of currently created threads, memory usage of the processor, and a read/write status of a memory of an electronic device on which the operating system is installed.

When the idle percentage of the processor running the operating system indicates that the processor is in an idle state, the operating system may usually allocate more threads to the first task queue. When the idle percentage of the processor running the operating system indicates that the processor is in a busy state, the operating system may usually allocate fewer threads to the first task queue or temporarily not allocate a thread to the first task queue. Specifically, the idle percentage of the processor may be further divided into a plurality of levels, and a correspondence between different levels and a thread that can be allocated by the operating system is configured. The operating system may allocate a corresponding thread to the first task queue based on the correspondence.

In addition, if a large quantity of threads have been currently created by the operating system, it is usually indicated that current load of the operating system is high.

In this case, to avoid the burst of the quantity of threads, the operating system may usually allocate fewer threads to the first task queue.

In a running process of the operating system, the memory of the processor is usually occupied. Higher memory usage usually indicates higher current load of the operating system. In this case, when the memory usage is high, to ensure the successful running of the operating system, the operating system may usually allocate fewer threads to the first task queue.

In addition, in the running process, the operating system usually needs to write data into the memory of the electronic device and read data from the memory. More frequent reading and writing of the memory indicates higher current load of the operating system. In this case, to ensure the successful running of the operating system, when reading and writing of the memory are frequent, the operating system may usually allocate fewer threads to the first task queue.

Certainly, the load level of the operating system may alternatively be determined by using another parameter. This is not limited in embodiments of this application.

After the operating system allocates the thread to the first task queue, the thread may execute the task in the first task queue, to meet a requirement of the application on executing the task, to implement a function that needs to be implemented by the application.

In the thread management method disclosed in embodiments of this application, an application may submit first information to an operating system through an API. The first information is used to indicate at least one first task to be executed by the application. The operating system determines, by using the first information, the at least one first task to be executed by the application, allocates the at least one first task to a corresponding first task queue, and allocates a thread to the first task queue based on a current load level of the operating system and the type of the first task queue.

In other words, according to the solutions disclosed in embodiments of this application, the operating system can allocate a thread required by the application. In addition, in a process of allocating the thread, the operating system considers a load level of the operating system, to prevent the application from abusing the thread, avoid burst of a quantity of threads, and enable the operating system to run efficiently.

Figure 3:
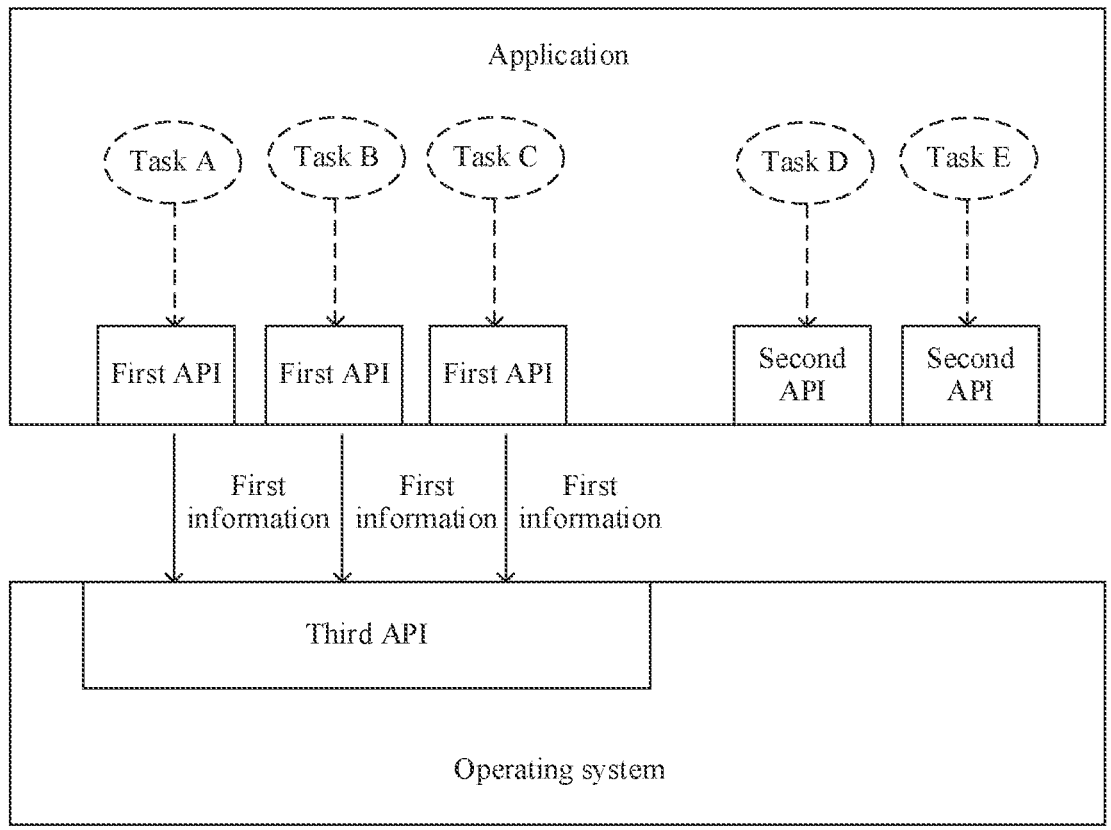
FIG. 3 is a schematic diagram of data exchange in a thread management method according to an embodiment of this application.

To clarify the solutions disclosed in embodiments of this application. FIG. 3 is disclosed. FIG. 3 is a schematic diagram of data exchange between an application and an operating system in the solutions disclosed in embodiments of this application.

In this embodiment of this application, the operating system needs to determine first information of the application, to manage and control, based on the first information, a thread required by the application. In this case, at least one first API is set in the application, and each first API may be configured to submit, to the operating system, first information of a task corresponding to the first API. In other words, when the application needs to execute a task A, the application may submit first information of the task A to the operating system through the first API corresponding to the task A, so that the operating system allocates the task A to a corresponding first task queue.

Refer to FIG. 3. A third API is usually set in the operating system. The operating system may obtain first information submitted by the application through the third API, determine, based on the first information, at least one first task to be executed by the application, and allocate the at least one first task to a corresponding first task queue.

In the conventional technology, when an application needs to execute a task, the application usually creates a thread required by the application. In this case, the application sets a corresponding second API for each task. When the application needs to execute a task, the application invokes a second API corresponding to the task. After determining that the application invokes the second API, the operating system supports the application in generating a corresponding thread, so that the application generates a corresponding thread for a task that needs to be executed by the application.

Compared with the conventional technology, in the solutions disclosed in embodiments of this application, a second API corresponding to a task in an application may be updated to a first API corresponding to the task, so that the operating system may manage and control a thread required by the task, that is, the operating system allocates a thread to the task.

Further, the application may usually execute a plurality of tasks. In addition, in some scenarios, the application expects to create a thread for some of the tasks by the application. For example, in consideration of confidentiality, if the application does not expect to submit first information of some of the tasks to the operating system, the application may create a thread for these tasks. In this case, the application may reserve a second API corresponding to these tasks, and does not update the second API corresponding to these tasks to a first API.

For example, an application may execute a task A, a task B, a task C, a task D. and a task E. The application expects to create threads for the task D and the task E. In this case, refer to FIG. 3. The application may reserve second APIs respectively corresponding to the task D and the task E. and update second APIs respectively corresponding to the task A, the task B, and the task C to first APIs. When the application needs to execute the task D, the application may invoke the second API corresponding to the task D, and create, with support of the operating system, the thread corresponding to the task D. When needing to execute the task A, the application may submit first information of the task A to the operating system through the first API corresponding to the task A. After obtaining the first information of the task A, the operating system may allocate a corresponding thread to the task A based on a load level of the operating system.

According to this solution, on a premise of ensuring confidentiality of an application, an operating system can manage and control some threads required by the application, to reduce a quantity of threads generated by the application, and reduce a possibility of burst of the quantity of threads.

In this embodiment of this application, an operation of allocating, by the operating system, the thread to the first task queue based on the current load level of the operating system and the type of the first task queue is disclosed. This operation may be implemented in a plurality of manners.

In one of feasible manners, after allocating the first task to the corresponding first task queue, the operating system determines, based on the current load level of the operating system, whether a corresponding thread can be generated for the first task. When the operating system determines that the current load level of the operating system supports creation of a thread for the first task, the operating system creates the corresponding thread for the first task, and allocates the thread to the first task queue.

In this manner, the operating system may create a thread for the application whenever the application needs the thread and the load level of the operating system supports creation, to avoid the burst of the quantity of threads.

Figure 4:
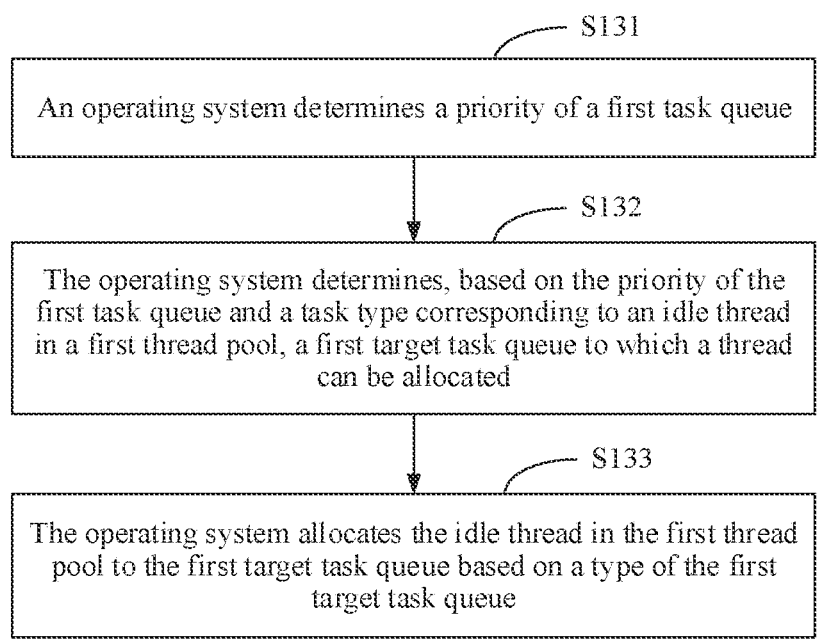
FIG. 4 is a schematic diagram of a working procedure of still another thread management method according to an embodiment of this application.

In another feasible manner, as shown in FIG. 4, that the operating system allocates a thread to the first task queue based on a current load level of the operating system and the type of the first task queue includes the following steps.

Step S131: The operating system determines a priority of the first task queue.

In this embodiment of this application, the operating system may determine a sequence of allocating a thread based on the priority of the first task queue. In this case, the operating system usually preferably allocates a thread to a first task queue with a high priority.

In addition, the operating system may determine the priority of the first task queue in a plurality of manners, for example, may determine the priority of the first task queue based on related information of the application, or a type of a task included in the first task queue.

Step S132: The operating system determines, based on the priority of the first task queue and a task type corresponding to an idle thread in a first thread pool, a first target task queue to which a thread can be allocated. The first thread pool includes an idle thread created by the operating system based on the current load level of the operating system.

In this embodiment of this application, the operating system may pre-create at least one idle thread based on the current load level of the operating system. The at least one idle thread is located in the first thread pool. The idle thread refers to a thread that does not execute a task.

In addition, different threads may be used to perform tasks of different types. In this case, the operating system may determine, based on the priority of the first task queue and the task type corresponding to the idle thread in the first thread pool, the first target task queue to which the thread can be allocated.

For example, when the idle thread in the first thread pool includes a first thread, a second thread, and a third thread, the first thread may be used to execute tasks in a first task queue A and a first task queue B, the second thread and the third thread are used to execute a task in a first task queue C, and a priority of the first task queue A is higher than a priority of the first task queue B, it may be determined that the first task queue A is the first target task queue.

Step S133: The operating system allocates the idle thread in the first thread pool to the first target task queue based on a type of the first target task queue.

The type of the first target task queue usually includes a serial task queue and/or a parallel task queue, or the type of the first target task queue is determined based on content of a task included in the first target task queue. For example, if the content of the task included in the first target task queue is a UI update task, the type of the first target task queue is a UI update task type. Certainly, the first target task queue may further include a task queue of another type. This is not limited in embodiments of this application.

Figure 5:
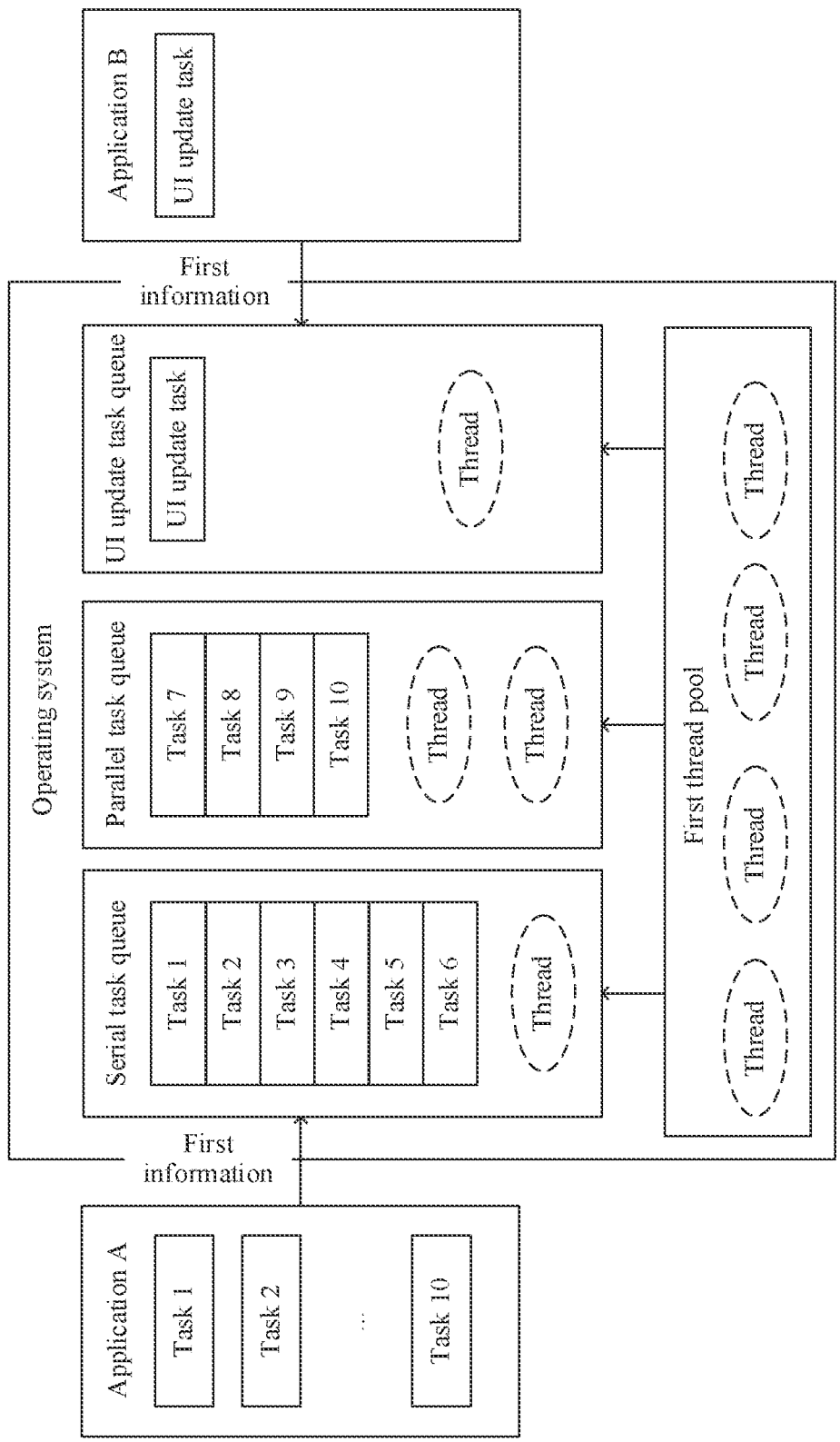
FIG. 5 is a schematic diagram of a scenario for a thread management method according to an embodiment of this application.

To clarify a method for allocating the thread to the first task queue in this embodiment of this application, this application discloses an example. Refer to a schematic diagram of a scenario shown in FIG. 5. In this example, an application A and an application B are installed on an electronic device, and an operating system of the electronic device manages and controls a thread required by the application A and the application B.

A first task to be executed by the application A includes a task 1, a task 2, a task 3, . . . , and a task 10, and the application A submits first information of each first task to the operating system. A first task to be executed by the application B includes a UI update task, and the application B submits first information of the UI update task to the operating system.

After receiving the first information submitted by the application A and the application B, the operating system may allocate the first tasks of the application A and the application B to corresponding first task queues based on the first information. In this example, the operating system allocates the first task of the application A to a serial task queue and a parallel task queue. The serial task queue includes a task 1, a task 2, a task 3, . . . , and a task 6 of the application A. The parallel task queue includes a task 7, a task 8, a task 9, and a task 10 of the application A. In addition, the operating system allocates the first task of the application B to a UI update task queue.

The operating system creates a first thread pool. The first thread pool includes an idle thread created by the operating system based on a load level of the operating system. When the operating system determines, based on the priority of the first task queue and the task type corresponding to the idle thread in the first thread pool, that the serial task queue and the parallel task queue that correspond to the application A and the UI update task queue that corresponds to the application B are the first target task queue, in this case, the operating system may allocate threads to the serial task queue and the parallel task queue that correspond to the application A and the UI update task queue that corresponds to the application B, so that the application A and the application B can execute corresponding tasks based on the threads allocated by the operating system.

In the solution disclosed in Step S131 to Step S133, the operating system generates, in advance based on the load level of the operating system, the first thread pool including the idle thread. When a thread needs to be allocated to the first target task queue, the operating system allocates, to the first target task queue, the idle thread pre-created in the first thread pool, so that there is no need to temporarily create a thread for the first target task queue. Therefore, this solution can increase a speed at which the operating system allocates the thread to the application, and correspondingly increase a speed at which the application executes a task by using the thread, thereby bringing better experience to a user.

When the type of the first target task queue usually includes the serial task queue and/or the parallel task queue, in this embodiment of this application, the idle thread in the first thread pool is usually allocated to the first target task queue in the following manner:

When the first target task queue includes the serial task queue, the operating system allocates an idle thread in the first thread pool to the serial task queue.

Alternatively, when the first target task queue includes the parallel task queue, the operating system allocates n idle threads in the first thread pool to the parallel task queue based on a quantity of tasks in the parallel task queue. A maximum value of n is a quantity of tasks included in the parallel task queue.

There is strong time dependency between tasks included in the serial task queue, and the tasks usually need to be sequentially executed in a time sequence, that is, a next task can be executed only after a task is completed. If more threads are allocated to the serial task queue, when one thread works, another thread is in an idle state, resulting in thread waste. Therefore, in this embodiment of this application, the idle thread in the first thread pool is allocated to the serial task queue, so that the idle thread sequentially executes all the tasks in the serial task queue, to reduce the thread waste.

In addition, there is no strong time dependency between tasks included in the parallel task queue, and the tasks may be executed at the same time, or another task may be executed after execution of one task is completed. In this case, the operating system may allocate the thread to the parallel task queue based on a quantity of the tasks included in the parallel task queue. In addition, the operating system allocates a maximum of n idle threads to the parallel task queue, where n is the quantity of the tasks included in the parallel task queue, to avoid the thread waste.

For example, when there are more idle threads that can execute the tasks in the parallel task queue and that are in the first thread pool, and there are a large quantity of the tasks in the parallel task queue, the operating system may allocate more threads to the parallel task queue, to improve task execution efficiency. When there are fewer idle threads that can execute the tasks in the parallel task queue and that are in the first thread pool, and there are a small quantity of the tasks in the parallel task queue, the operating system may allocate fewer threads to the parallel task queue, to avoid burst of the quantity of threads.

In the thread management method disclosed in embodiments of this application, the operating system manages and controls the thread required by the application, and allocates the corresponding thread to the application. Further, this embodiment of this application may further include the following operations.

After at least one task in the first target task queue is completed, the operating system reclaims, to the first thread pool, a thread allocated to the first target task queue, or the operating system schedules, to another task queue, a thread allocated to the first target task queue, or the operating system destroys a thread allocated to the first target task queue.

If the task in the first target task queue is completed, the thread previously allocated to the first target task queue enters an idle state. To avoid waste of the thread, the operating system may reclaim the thread to the first thread pool. After the thread is reclaimed to the first thread pool, the thread may be further allocated to another task queue, and continue to execute a task in the another task queue, to reduce the thread waste.

Alternatively, after the task in the first target task queue is completed, if the thread allocated to the first target task queue can further execute a task in another task queue, the operating system may allocate the thread to the another task queue, so that the thread executes the task in the another task queue, to avoid waste of the thread and improve execution efficiency of the task in the another task queue.

In addition, if the another task queue includes a serial task queue, and a thread has been allocated to the serial task queue, the operating system does not allocate the thread to the serial task queue.

Alternatively, after the task in the first target task queue is completed, the operating system may further destroy the thread allocated to the first target task queue, to reduce a quantity of threads, and further avoid burst of the quantity of threads.

In the conventional technology, after a thread created by an application executes a task, even if the application no longer needs the thread, the thread usually continues to exist, resulting in waste of thread resources.

In the solutions of embodiments of this application, the operating system may reclaim, schedule, and destroy a thread that completes a task, to reduce the thread waste and avoid the burst of the quantity of threads.

Figure 6:
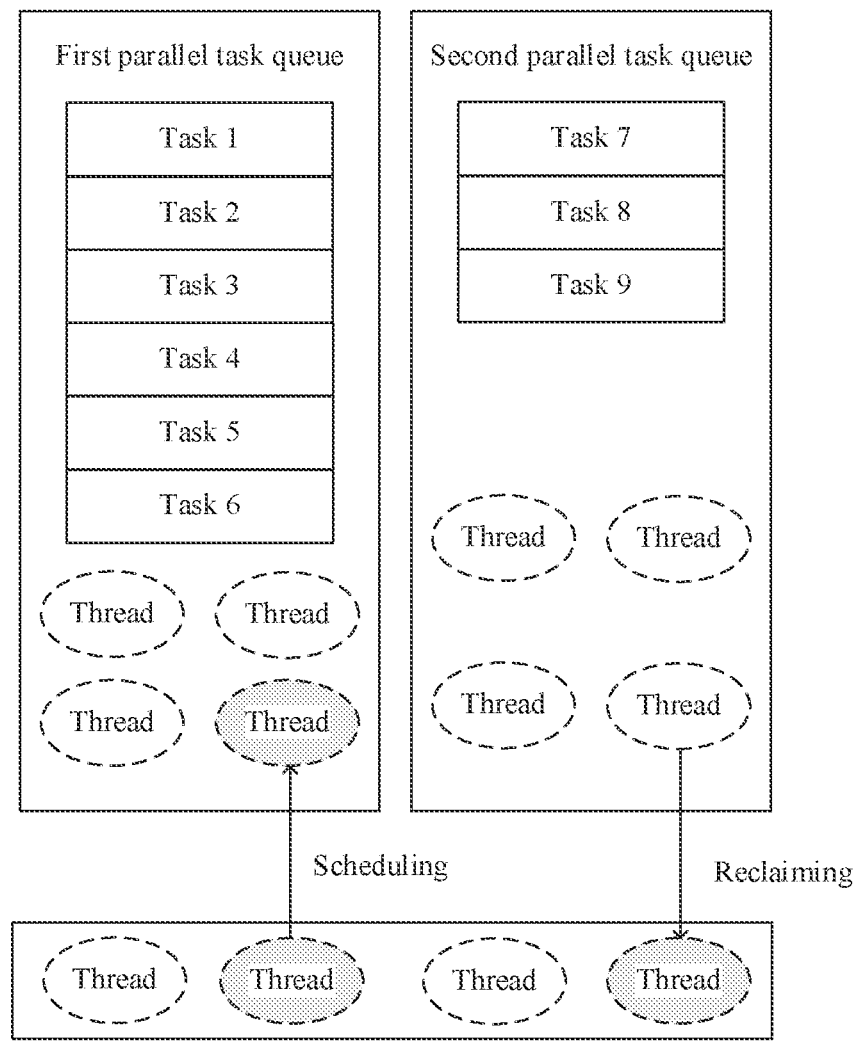
FIG. 6 is a schematic diagram of a scenario for still another thread management method according to an embodiment of this application.

To clarify that the operating system may manage and control the thread in embodiments of this application, this application discloses an example. Refer to a schematic diagram of a scenario shown in FIG. 6. In this example, a task of an application is allocated to two first task queues. The two first task queues are separately a first parallel task queue and a second parallel task queue. The first parallel task queue includes a task 1, a task 2, a task 3, . . . , and a task 6. The like. The second parallel task queue includes a task 7, a task 8, and a task 9. In addition, an operating system separately allocates corresponding threads to the two first task queues.

As tasks in the second parallel task queue are gradually completed, fewer tasks are included in the second parallel task queue. When the second parallel task queue includes three tasks to be executed, and the operating system previously allocates four threads to the second parallel task queue, to avoid thread waste, the operating system may reclaim one of the threads, and the remaining three threads separately execute the three tasks to be executed, to reduce the thread waste.

In addition, as threads are reclaimed, idle threads in a first thread pool increase, and the first parallel task queue includes more tasks to be executed. When the idle thread added to the first thread pool may be used to execute the task included in the first parallel task queue, the operating system may schedule the thread to the first parallel task queue, that is, threads allocated by the operating system to the first parallel task queue increase, to improve execution efficiency of the task in the first parallel task queue.

In a feasible solution of embodiments of this application, an operating system pre-creates a first thread pool based on a load level of the operating system. After determining a first target task queue, the operating system may determine a thread that is in the first thread pool and that is used to execute a task in the first target task queue, and allocate the thread to the first target task queue.

However, there are usually a plurality of tasks that can be executed by an application. In some cases, the application needs to execute a task, but a first thread pool created by the operating system does not include a thread used to execute the task. In this case, this application discloses another embodiment. This embodiment further includes the following steps.

When the operating system determines that the first task queue includes a second target task queue, and the first thread pool does not include a thread used to execute a task in the second target task queue, the operating system creates and allocates a corresponding thread to the second target task queue, or, the operating system supports the application in creating a corresponding thread for the second target task queue.

The second target task queue is a first task queue whose priority is higher than a first priority, and/or the second target task queue includes a target task.

In this embodiment of this application, the first priority may be set based on a user requirement. When a priority of a task queue is higher than the first priority, it is indicated that a task in the task queue is important. In addition, the operating system may further set at least one target task depending on importance attached to each task. The target task is usually a task of relatively concern. A priority of the second target task queue is higher than the first priority, or the second target task queue includes the target task, and correspondingly, the second target task queue is an important task queue.

In this case, when the first thread pool does not include the thread used to execute the task in the second target task queue, to ensure successful execution of the task in the second target task queue, the operating system may create and allocate the corresponding thread to the second target task queue, or support the application in creating the corresponding thread for the second target task queue, to successfully execute the task in the second target task queue.

According to the foregoing steps, when a first thread pool does not include a thread for an important task queue, an operating system can create and allocate a corresponding thread to the task queue, to ensure successful execution of a task in the task queue.

In the foregoing embodiments, solutions of determining the first target task queue and the second target task queue based on a priority of the first task queue are separately disclosed. In this embodiment of this application, the priority of the first task queue may be determined in a plurality of manners.

In a feasible implementation, that the operating system determines a priority of the first task queue includes:

The operating system determines the priority of the first task queue based on second information that is of the at least one first task and that is submitted by the application.

In this implementation, the application submits the second information of the first task to the operating system. The second information is used to indicate a priority of the first task. Then, the operating system determines the priority of the first task based on the second information of the first task, and determines, based on the priority of the first task, the priority of the first task queue that includes the first task. In other words, in this implementation, the operating system determines the priority of the first task queue based on the information submitted by the application.

For example, the operating system may determine that the priority of the first task queue is the same as the priority of the first task. Alternatively, when the first task queue includes a plurality of first tasks, the operating system may determine that an average value of priorities of the plurality of first tasks is the priority of the first task queue.

In addition, in this implementation, the application may submit the second information of the first task to the operating system through a first API corresponding to the first task. In addition, the first information and the second information of the first task may be loaded into a same piece of information. The operating system may obtain both the first information and the second information of the first task by submitting the piece of information. Alternatively, the first information and the second information of the first task may be two independent pieces of information. This is not limited in embodiments of this application.

Alternatively, in another feasible implementation, the operating system determines the priority of the first task queue based on third information of the application.

The third information includes at least one of the following: a running platform for the application, whether the application is currently visible, whether a function of the application is currently perceivable, and an application frequency of the application.

The running platform for the application usually includes a foreground and a background. An application running in the foreground is usually an application to which a user pays more attention. Correspondingly, a task queue of the application running in the foreground has a higher priority.

Therefore, when the third information includes the running platform for the application, the operating system determines that a priority of a first task queue of a first application is higher than a priority of a first task queue of a second application. A running platform for the first application is a foreground, and a running platform for the second application is a background.

Whether the application is currently visible means whether an interface, information, and/or the like of the application are/is visible. When the application runs in the foreground, and the user can view the interface of the application, the application is currently visible. In addition, even if some applications run in the background, when a new message is received, thumbnail content of the message is displayed on a notification bar. In this case, it is generally considered that the application is currently visible. For example, when the application is a communication program, and the communication program runs in the background, to prevent the user from missing a communication message sent by another user, thumbnail content of the communication message may be displayed on a notification bar of an electronic device based on a setting of the user. In this case, the communication program is a currently visible application.

If an application is currently visible, it is indicated that the user pays more attention to the application. Correspondingly, when the third information includes whether the application is currently visible, the operating system determines that a priority of a first task queue of a third application is higher than a priority of a first task queue of a fourth application. The third application is currently visible, and the fourth application is currently invisible.

In addition, the third information may include whether the function of the application is currently perceptible. The application usually includes a plurality of functions, and some of the functions can be perceived by the user. For example, when the application is an audio playing application, if the user can hear audio when the application plays the audio, the function of the application is currently perceptible. Alternatively, when the application is a navigation application, if the user can hear a navigation indication sent by the application, the function of the application is currently perceptible.

If a function of an application is currently perceptible, it is indicated that the user pays more attention to the application. Correspondingly, when the third information includes whether the function of the application is currently perceivable, the operating system determines that a priority of a first task queue of a fifth application is higher than a priority of a first task queue of a sixth application. A function of the fifth application is currently perceivable, and a function of the sixth application is not currently perceivable.

In addition, an operating system may further determine a priority of a task queue of an application based on an application frequency of the application. In this case, the operating system may further count an application frequency of each application. Correspondingly, when the third information includes the application frequency of the application, the operating system determines that a priority of a first task queue of a seventh application is higher than a priority of a first task queue of an eighth application. An application frequency of the seventh application is higher than an application frequency of the eighth application. In other words, a task queue of an application with a higher application frequency has a higher priority.

In the foregoing solution, a method for determining the priority of the first task queue when the third information separately includes the running platform for the application, whether the application is currently visible, whether the function of the application is currently perceivable, and the application frequency of the application is described. In addition, the priority of the first task queue of the application may be further jointly determined with reference to the foregoing two or more kinds of third information.

For example, when the third information includes the running platform for the application and the application frequency of the application, the operating system usually determines that the running platform is the foreground, and a first task queue of an application with a higher application frequency has a highest priority, or the running platform is the background, and a first task queue of an application with a lower application frequency has a lowest priority.

Alternatively, when the priority of the first task queue of the application is jointly determined with reference to the two or more kinds of third information, a confidence level separately corresponding to different third information may be further set. In this case, the operating system determines the priority of the first task queue based on the confidence level.

In another feasible implementation, that the operating system determines a priority of the first task queue includes: The operating system determines the priority of the first task queue based on a type of a task included in the first task queue.

In this implementation, the operating system sets a correspondence between a type of each task and a priority of the task. The operating system may determine a priority of the first task based on the correspondence and a type of the first task, and then determine, based on the priority of the first task, the priority of the first task queue including the first task. In other words, in this implementation, the operating system determines, based on the priority of the first task, the priority of the first task queue including the first task.

For example, in this implementation, a priority corresponding to a UI update task of an application may be set to a highest priority. When determining that a first task to be executed by the application includes the UI update task, the operating system may determine a priority of the UI update task based on the correspondence, and further determine, based on the priority of the UI update task, the priority of a task queue including the UI update task.

Alternatively, in another feasible implementation, that the operating system determines a priority of the first task queue includes: The operating system determines the priority of the first task queue based on waiting duration of the first task queue.

In this embodiment of this application, to avoid burst of a quantity of threads, the operating system may preferably allocate threads to some first task queues. When a load level of the operating system is insufficient to support in allocating threads to all first task queues, the some first task queues usually need to wait for a period of time before obtaining the threads allocated by the operating system. To avoid that normal running of an application is affected due to excessively long waiting time of the first task queue, the operating system may determine the priority of the first task queue based on the waiting duration of the first task queue.

In this implementation, the operating system may increase the priority of the first task queue by one level whenever the waiting duration of the first task queue exceeds a first time period, until the operating system can allocate a thread to the first task queue, to avoid the excessively long waiting duration of the first task queue.

The foregoing descriptions separately disclose solutions in which the operating system determines the priority of the first task queue based on the second information of the first task, the third information of the application, the type of the task, and the waiting duration of the first task queue. In addition, the priority of the first task queue may be further determined with reference to the foregoing two or more manners.

For example, the operating system may determine the priority of the first task queue based on both the third information of the application and the type of the task included in the first task queue. The third information of the application may be a running platform for the application. In this case, when a running platform for an application is a foreground, and a priority corresponding to a type of a task in a first task queue of the application is a higher priority, it may be determined that the priority of the first task queue of the application is a high priority.

In this embodiment of this application, the operating system generates a first thread pool based on a current load level of the operating system. The first thread pool includes an idle thread generated by the operating system, so that the operating system can allocate a corresponding thread to a task that needs to be executed by an application program.

Different threads may execute different tasks. Different applications need to execute different tasks. The operating system may generate the first thread pool based on the current load level of the operating system. In this case, this embodiment of this application further includes the following steps:

Step 1: The operating system determines, in a first time period, at least one first application whose application frequency is higher than a first threshold.

Step 2: The operating system determines, in the first time period, a target thread whose frequency is higher than a second threshold and that is applied by the first application.

Step 3: The operating system determines, based on the current load level of the operating system, a quantity of target threads that can be supported, and generates a corresponding quantity of target threads, where the target threads are located in the first thread pool.

According to the foregoing steps, the operating system may generate a thread in the first thread pool. In addition, the target thread generated by the operating system is a thread that is applied by the first application at a higher frequency, and the first application is an application with a higher application frequency on an electronic device. In this case, the thread generated by the operating system is a thread with a higher application frequency, so that the thread in the first thread pool can meet requirements in most scenarios.

Alternatively, in another method in which the operating system generates the first thread pool based on the current load level of the operating system, a correspondence between each application and a thread required by the application may be set in the operating system. In a running process of the electronic device, the operating system determines an application installed on the electronic device, and generates a corresponding thread based on the correspondence between the application and the thread required by the application. The thread is located in the first thread pool.

Certainly, the operating system may alternatively generate the thread in the first thread pool in another manner. This is not limited in embodiments of this application.

In addition, after creating the first thread pool, the operating system may further adjust a thread included in the first thread pool after a load level of the operating system changes. For example, after the load level of the operating system increases, the operating system may destroy some of the threads to ensure successful running of the operating system. After the load level of the operating system decreases, the operating system may generate a new idle thread, and place the idle thread in the first thread pool, so that the first thread pool can meet a requirement of an application on more threads.

In the foregoing embodiments, a method for managing, by an operating system, a thread required by an application is separately disclosed. In addition, in a running process of the operating system, the operating system usually further needs to execute some tasks. Correspondingly, the operating system needs a thread used to execute a task of the operating system. To manage the thread required by the operating system, this embodiment of this application further discloses the following steps:

The operating system allocates at least one second task to be executed by the operating system to a corresponding second task queue.

The operating system determines a priority of the second task queue.

The operating system allocates an idle thread included in a second thread pool to the second task queue based on the priority of the second task queue. The idle thread included in the second thread pool is created by the operating system based on the current load level of the operating system.

In this embodiment of this application, when the operating system needs to execute the second task, the operating system allocates the second task to the corresponding second task queue, and then allocates an idle thread in the second thread pool to the second task queue based on the priority of the second task queue.

Different second task queues may correspond to different task types. For example, the operating system usually executes a display render task (namely, a render task) and a UI update task. In this case, the operating system may separately create second task queues corresponding to the display render task and the UI update task, and separately allocate the display render task and the UI update task to the corresponding second task queues.

In addition, the operating system usually determines the priority of the second task queue based on a type of a task included in the second task queue. For example, the operating system usually pays more attention to the display render task. Therefore, it is usually determined that a priority of a second task queue including the display render task is a higher priority.

In this embodiment of this application, the operating system creates the second thread pool based on the current load level of the operating system. The second thread pool includes an idle thread. In this case, the operating system may preferably allocate, based on the priority of the second task queue, the idle thread in the second thread pool to a second task queue with a higher priority.

In addition, in this embodiment of this application, the second thread pool and the first thread pool may be a same thread pool, that is, the thread pool includes a thread required by both the operating system and the application. Alternatively, the second thread pool and the first thread pool may be different thread pools. This is not limited in embodiments of this application.

Figure 7:
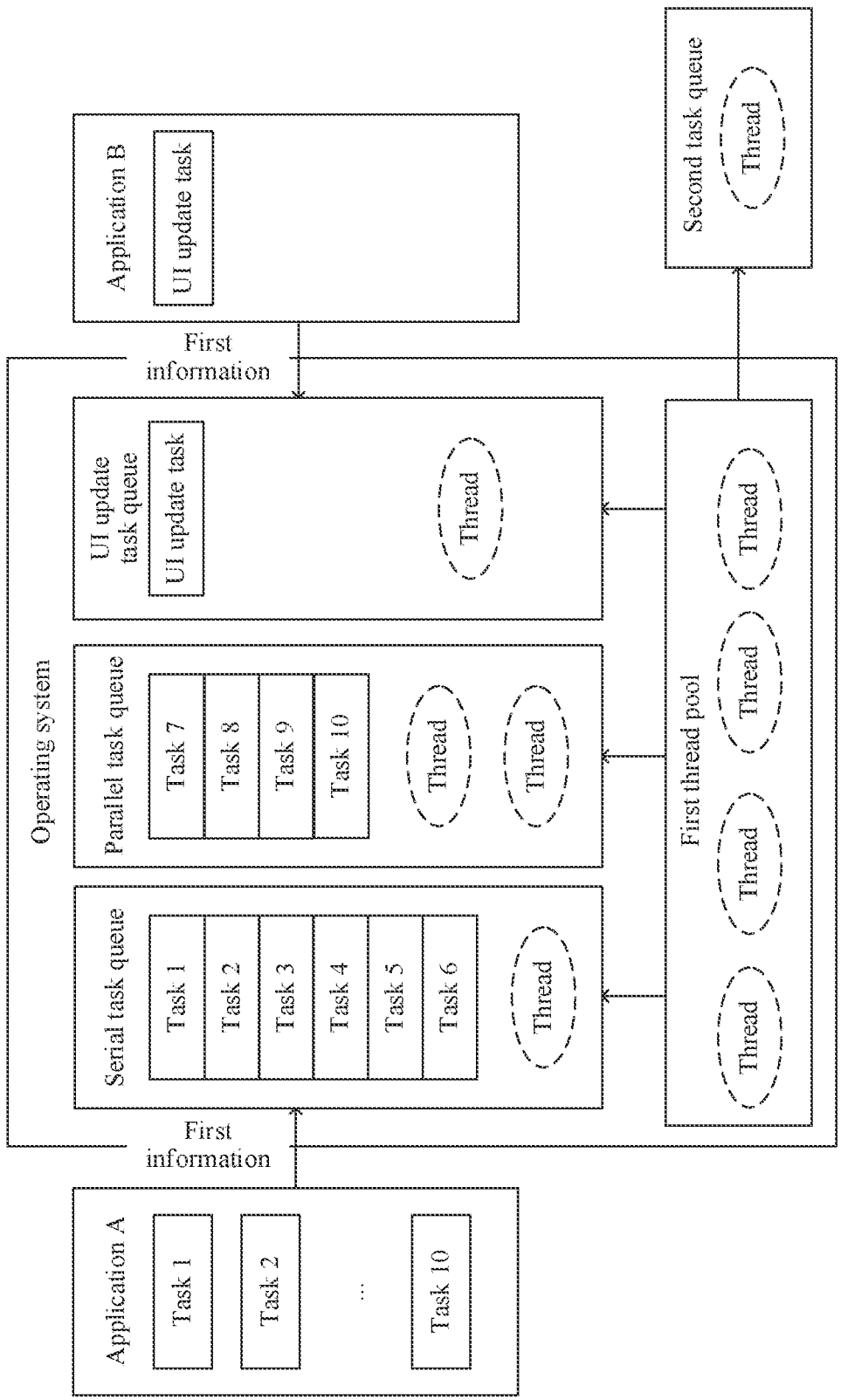
FIG. 7 is a schematic diagram of a scenario for still another thread management method according to an embodiment of this application.

When the first thread pool and the second thread pool are the same thread pool, to clarify a method for allocating the thread to the second task queue in this embodiment of this application, this application discloses an example. Refer to a schematic diagram shown in FIG. 7. In this example, an application A and an application B are installed on an electronic device, and an operating system of the electronic device controls a thread required by the application A and the application B.

A first task to be executed by the application A includes a task 1, a task 2, a task 3, . . . , and a task 10. A first task to be executed by the application B includes a UI update task. After receiving first information submitted by the application A and the application B, the operating system may allocate the first tasks of the application A and the application B to corresponding first task queues based on the first information. In this example, the operating system allocates the first task of the application A to a serial task queue and a parallel task queue. In addition, the operating system allocates the first task of the application B to a UI update task queue.

The operating system creates a first thread pool. The first thread pool includes an idle thread created by the operating system based on a load level of the operating system. In addition, the operating system may allocate a thread in the first thread pool to the serial task queue and the parallel task queue that correspond to the application A and the UI update task queue that corresponds to the application B, so that the application A and the application B can execute corresponding tasks based on the thread allocated by the operating system.

Further, in this example, the first thread pool and the second thread pool are the same thread pool. Therefore, the first thread pool further includes a thread allocated to a task that needs to be executed by the operating system. In this case, after the operating system allocates a second task to a second task queue, the operating system may further allocate, to the second task queue, a thread that is in the first thread pool and that can execute the second task, so that the thread executes a task in the second task queue.

Correspondingly, embodiments of this application further disclose a thread management method. The thread management method is executed by an application. Refer to a schematic diagram of a working procedure shown in FIG. 8. The thread management method includes the following steps:

Step S21: When needing to execute a first task, an application submits first information to an operating system through a first application programming interface API corresponding to the first task. The first information is used to indicate the first task.

Step S22: The application executes the first task by using a thread allocated by the operating system to the first task.

In this embodiment of this application, the application submits the first information to the operating system through the first API of the application. The operating system determines, based on the first information, a first task to be executed, allocates the at least one first task to a corresponding first task queue, and allocates a thread to the first task queue based on a current load level of the operating system and a type of the first task queue. The application executes the first task by using the thread allocated by the operating system to the first task.

In this case, the user program does not need to create a thread for the first task, but the operating system allocates a thread required by the application, that is, the operating system allocates the thread for the first task to the user program, to prevent the application from abusing the thread, avoid burst of a quantity of threads, and enable the operating system to run efficiently.

Further, in this embodiment of this application, the method further includes the following steps:

When the application does not obtain, in a first time period after the first information is submitted, the thread allocated by the operating system to the first task, the application transmits a first request to the operating system through a second API corresponding to the first task.

After obtaining a first feedback corresponding to the first request, the application generates a thread corresponding to the first task, and executes the first task by using the thread.

A same task of an application may have both a first API and a second API. In addition, when the application needs to execute the task, the application preferably submits first information of the task to the operating system through the first API, so that the operating system allocates a thread to the task. However, after a first time period, if the application does not obtain the thread allocated by the operating system to the task, the application may invoke the second API. After determining that the application invokes the second API, the operating system usually supports the application in generating the thread corresponding to the task, to avoid excessively long waiting time of the application.

Optionally, in this embodiment of this application, the method further includes:

The application submits second information of the first task to the operating system through the first API corresponding to the first task. The second information is used to indicate a priority of the first task.

According to the foregoing step, the operating system may obtain the second information that is of the first task and that is submitted by the application, and determine, by using the second information, a priority of a task queue in which the first task is located.

The following describes apparatus embodiments of this application, which may be used to perform the method embodiments of this application. For details not disclosed in the apparatus embodiments of this application, refer to the method embodiments of this application.

Figure 9:
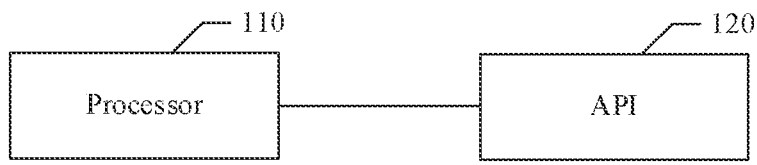
FIG. 9 is a schematic diagram of a structure of a thread management method according to an embodiment of this application.

Embodiments of this application disclose a thread management apparatus. Refer to a schematic diagram shown in FIG. 9. The thread management apparatus includes:

a processor 110 and an application programming interface API 120.

The API 120 is configured to obtain at least one piece of first information of an application. The first information is used to indicate a first task to be executed by the application.

The processor 110 is configured to: allocate the at least one first task to a corresponding first task queue, and allocate a thread to the first task queue based on a current load level of an operating system of the processor and a type of the first task queue.

According to the solutions disclosed in embodiments of this application, the operating system can allocate a thread required by the application. In addition, in a process of allocating the thread, the operating system considers a load level of the operating system, to prevent the application from abusing the thread, avoid burst of a quantity of threads, and enable the operating system to run efficiently.

Further, the processor is specifically configured to: determine a priority of the first task queue;

determine, based on the priority of the first task queue and a task type corresponding to an idle thread in a first thread pool, a first target task queue to which a thread can be allocated, where the first thread pool includes an idle thread created based on the current load level of the operating system; and allocate the idle thread in the first thread pool to the first target task queue based on a type of the first target task queue.

In this embodiment of this application, the operating system may create the first thread pool, and the first thread pool includes the idle thread. In this case, when a thread needs to be allocated to the first target task queue, the operating system allocates, to the first target task queue, the idle thread pre-created in the first thread pool, so that there is no need to temporarily create a thread for the first target task queue. Therefore, this solution can increase a speed at which the operating system allocates the thread to the application, and correspondingly increase a speed at which the application executes a task by using the thread, thereby bringing better experience to a user.

In addition, based on the type of the first target task queue, the processor may allocate a corresponding thread to the first target task queue in different manners.

In a feasible manner, in the apparatus disclosed in embodiments of this application, the processor is specifically configured to: when the first target task queue includes a serial task queue, allocate an idle thread in the first thread pool to the serial task queue; or when the first target task queue includes a parallel task queue, allocate n idle threads in the first thread pool to the parallel task queue based on a quantity of tasks in the parallel task queue, where a maximum value of n is a quantity of tasks included in the parallel task queue.

There is strong time dependency between tasks included in the serial task queue, and the tasks usually need to be sequentially executed in a time sequence, that is, a next task can be executed only after a task is completed. If more threads are allocated to the serial task queue, when one thread works, another thread is in an idle state, resulting in thread waste. Therefore, in this embodiment of this application, the idle thread in the first thread pool is allocated to the serial task queue, so that the idle thread sequentially executes all the tasks in the serial task queue, to reduce the thread waste.

In addition, there is no strong time dependency between tasks included in the parallel task queue, and the tasks may be executed at the same time, or another task may be executed after execution of one task is completed. In this case, the operating system may allocate the thread to the parallel task queue based on a quantity of the tasks included in the parallel task queue. In addition, the operating system allocates a maximum of n idle threads to the parallel task queue, where n is the quantity of the tasks included in the parallel task queue, to avoid the thread waste.

Further, in the apparatus disclosed in embodiments of this application, the processor is further configured to: after at least one task in the first target task queue is completed, reclaim, to the first thread pool, a thread allocated to the first target task queue, or schedule, to another task queue, a thread allocated to the first target task queue, or destroy a thread allocated to the first target task queue.

According to the thread management apparatus disclosed in embodiments of this application, a thread that completes a task can be reclaimed, scheduled, and destroyed, to reduce the thread waste and avoid burst of the quantity of threads.

Further, in the apparatus disclosed in embodiments of this application, the processor is further configured to: when the first task queue includes a second target task queue, and the first thread pool does not include a thread used to execute a task in the second target task queue, create and allocate a corresponding thread to the second target task queue, or support the application in creating a corresponding thread for the second target task queue.

The second target task queue is a first task queue whose priority is higher than a first priority, and/or the second target task queue includes a target task.

In the solutions disclosed in embodiments of this application, when the first thread pool does not include the thread used to execute the task in the second target task queue, to ensure successful execution of the task in the second target task queue, the processor may create and allocate the corresponding thread to the second target task queue, or support the application in creating the corresponding thread for the second target task queue, to successfully execute the task in the second target task queue.

In this embodiment of this application, the priority of the first task queue may be determined in a plurality of manners. The processor is configured to determine the priority of the first task queue based on second information that is of the at least one first task and that is submitted by the application; and/or the processor is configured to determine the priority of the first task queue based on third information of the application, where the third information includes at least one of the following: a running platform for the application, whether the application is currently visible, whether a function of the application is currently perceivable, and an application frequency of the application; and/or the processor is configured to determine the priority of the first task queue based on a type of a task included in the first task queue; and/or the processor is configured to determine the priority of the first task queue based on waiting duration of the first task queue.

When the third information includes the running platform for the application, the processor is configured to determine that a priority of a first task queue of a first application is higher than a priority of a first task queue of a second application. A running platform for the first application is a foreground, and a running platform for the second application is a background.

When the third information includes whether the application is currently visible, the processor is configured to determine that a priority of a first task queue of a third application is higher than a priority of a first task queue of a fourth application. The third application is currently visible, and the fourth application is currently invisible.

When the third information includes whether the function of the application is currently perceivable, the processor is configured to determine that a priority of a first task queue of a fifth application is higher than a priority of a first task queue of a sixth application. A function of the fifth application is currently perceivable, and a function of the sixth application is not currently perceivable.

When the third information includes the application frequency of the application, the processor is configured to determine that a priority of a first task queue of a seventh application is higher than a priority of a first task queue of an eighth application. An application frequency of the seventh application is higher than an application frequency of the eighth application.

In addition, in the apparatus disclosed in embodiments of this application, the processor is specifically configured to: determine, in a first time period, at least one first application whose application frequency is higher than a first threshold; determine, in the first time period, a target thread whose frequency is higher than a second threshold and that is applied by the first application; and determine, based on the current load level of the operating system, a quantity of target threads that can be supported, and generate a corresponding quantity of target threads.

In the apparatus disclosed in embodiments of this application, the load level of the operating system is determined by using at least one of the following parameters: an idle percentage of a processor running the operating system, a quantity of currently created threads, memory usage of the processor, and a read/write status of a memory of an electronic device on which the operating system is installed.

Further, in the apparatus disclosed in embodiments of this application, the processor is further configured to: allocate at least one second task to be executed by the processor to a corresponding second task queue;

determine a priority of the second task queue; and allocate an idle thread included in a second thread pool to the second task queue based on the priority of the second task queue, where the idle thread included in the second thread pool is created by the operating system based on the current load level of the operating system.

In the thread management method disclosed in embodiments of this application, an application may submit first information to an operating system through an API. The first information is used to indicate at least one first task to be executed by the application. The operating system determines, by using the first information, the at least one first task to be executed by the application, allocates the at least one first task to a corresponding first task queue, and allocates a thread to the first task queue based on a current load level of the operating system and a type of the first task queue.

According to the solutions disclosed in embodiments of this application, the operating system can allocate a thread required by the application. In addition, in a process of allocating the thread, the operating system considers a load level of the operating system, to prevent the application from abusing the thread, avoid burst of a quantity of threads, and enable the operating system to run efficiently.

Figure 10:
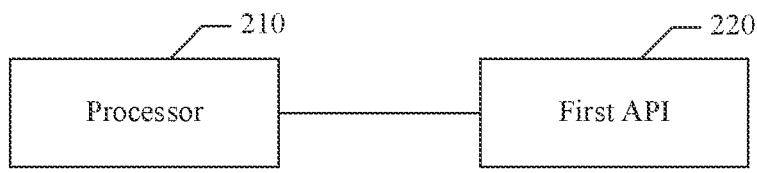
FIG. 10 is a schematic diagram of a structure of still another thread management method according to an embodiment of this application.

Correspondingly, embodiments of this application further disclose a thread management apparatus. Refer to a schematic diagram shown in FIG. 10. The thread management apparatus includes:

a processor 210 and a first application programming interface API 220.

When an application needs to execute a first task, the first API 220 corresponding to the first task is configured to submit first information to an operating system. The first information is used to indicate the first task.

The processor 210 is configured to execute the first task by using a thread allocated by the operating system to the first task.

According to the thread management apparatus disclosed in embodiments of this application, the operating system can allocate a thread required by the first task to the user program and the user program does not need to create the thread for the first task, to prevent the application from abusing the thread, avoid burst of a quantity of threads, and enable the operating system to run efficiently.

Further, the thread management apparatus disclosed in embodiments of this application further includes.

a second API.

When the thread allocated by the operating system to the first task is not obtained in a first time period after the first information is submitted, the second API corresponding to the first task is configured to transmit a first request to the operating system.

The processor is further configured to generate a thread corresponding to the first task after a first feedback corresponding to the first request is obtained, and execute the first task by using the thread.

Further, in the thread management apparatus disclosed in embodiments of this application, the processor is further configured to submit second information of the first task to the operating system through the first API corresponding to the first task. The second information is used to indicate a priority of the first task.

The operating system can determine the priority of the first task by using the second information transmitted through the first API.

Figure 11:
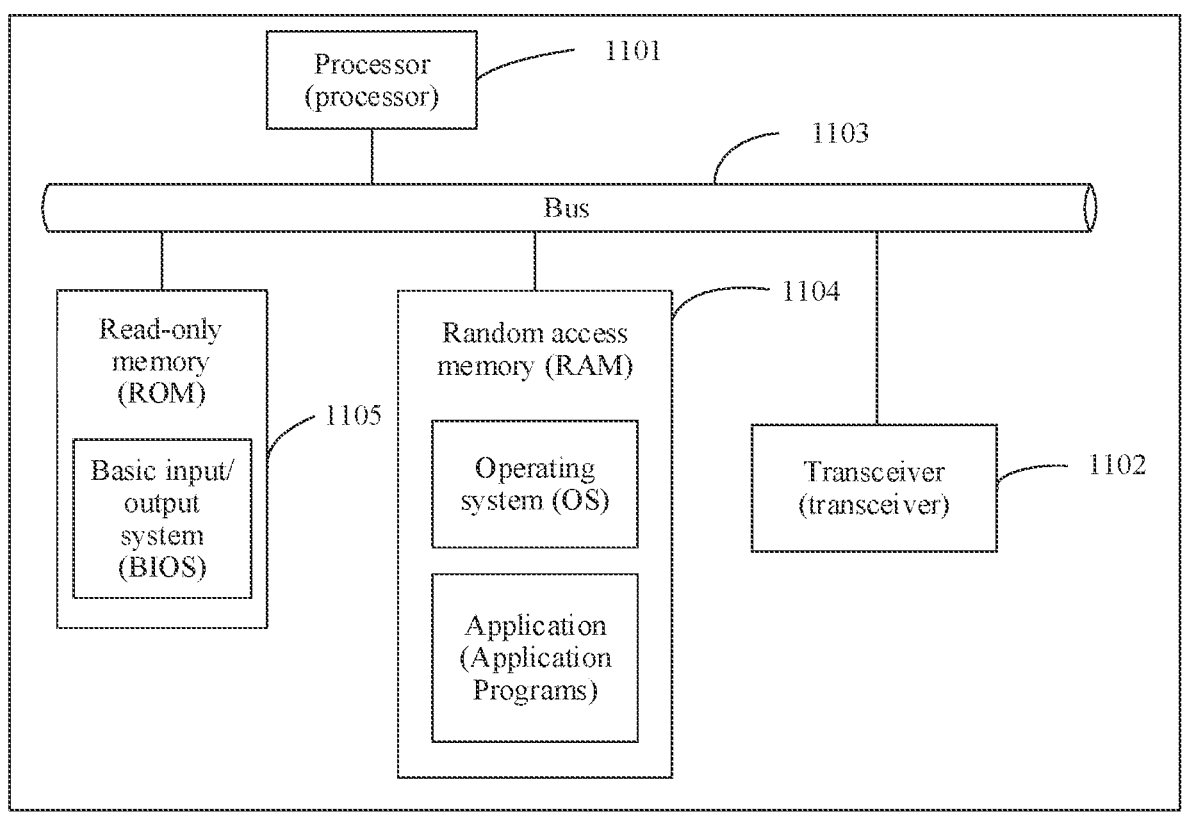
FIG. 11 is a schematic diagram of a structure of a terminal apparatus according to an embodiment of this application.

Correspondingly, corresponding to the foregoing methods, embodiments of this application further disclose a terminal apparatus. Refer to a schematic diagram of a structure shown in FIG. 11. The terminal apparatus includes:

at least one processor 1101 and a memory.

The memory is configured to store program instructions.

The processor is configured to invoke and execute the program instructions stored in the memory, so that the terminal apparatus performs all or some of the steps in the embodiments corresponding to FIG. 2 and FIG. 4.

Further, the terminal apparatus may further include a transceiver 1102 and a bus 1103. The memory includes a random access memory 1104 and a read-only memory 1105.

The processor is separately coupled to the transceiver, the random access memory, and the read-only memory by using the bus. When the terminal apparatus needs to run, a basic input/output system built into the read-only memory or a bootloader in an embedded system is used to boot a system to start, and boot the apparatus to enter a normal running state. After entering the normal running state, the apparatus runs an application and an operating system in the random access memory, so that a mobile terminal controls the apparatus to perform all or some of the steps in the embodiments corresponding to FIG. 2 and FIG. 4.

The apparatus in embodiments of the present invention may correspond to the thread management apparatus in the embodiments corresponding to FIG. 2 and FIG. 4. In addition, the processor and the like in the thread management apparatus may implement functions of and/or various steps and methods implemented by the thread management apparatus in the embodiments corresponding to FIG. 2 and FIG. 4. For brevity, details are not described herein again.

Correspondingly, corresponding to the foregoing methods, embodiments of this application further disclose a terminal apparatus. The terminal apparatus includes:

at least one processor and a memory.

The memory is configured to store program instructions.

Figure 8:
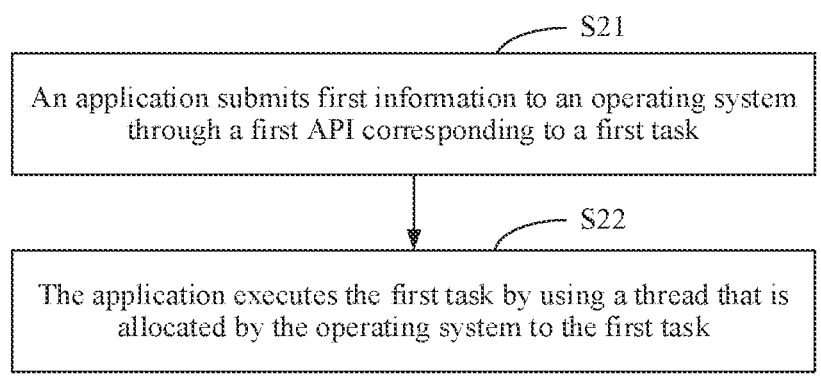
FIG. 8 is a schematic diagram of a working procedure of still another thread management method according to an embodiment of this application.

The processor is configured to invoke and execute the program instructions stored in the memory, so that the terminal apparatus performs all or some of the steps in the embodiment corresponding to FIG. 8.

Further, the terminal apparatus may further include a transceiver and a bus. The memory includes a random access memory and a read-only memory.

The processor is separately coupled to the transceiver, the random access memory, and the read-only memory by using the bus. When the terminal apparatus needs to run, a basic input/output system built into the read-only memory or a bootloader in an embedded system is used to boot a system to start, and boot the apparatus to enter a normal running state. After entering the normal running state, the apparatus runs an application and an operating system in the random access memory, so that a mobile terminal controls the apparatus to perform all or some of the steps in the embodiment corresponding to FIG. 8.

The apparatus in embodiments of the present invention may correspond to the thread management apparatus in the embodiment corresponding to FIG. 8. In addition, the processor and the like in the thread management apparatus may implement functions of and/or various steps and methods implemented by the thread management apparatus in the embodiment corresponding to FIG. 8. For brevity, details are not described herein again.

In specific implementation, embodiments of this application further provide a computer-readable storage medium. The computer-readable storage medium includes instructions. When a computer-readable medium disposed in any device runs on a computer, all or some of the steps in the embodiments corresponding to FIG. 2 and FIG. 4 may be implemented. A storage medium of the computer-readable medium may include: a magnetic disk, an optical disc, a read-only memory (English: read-only memory, ROM for short), a random access memory (English: random access memory, RAM for short), or the like.

In specific implementation, embodiments of this application further provide a computer-readable storage medium. The computer-readable storage medium includes instructions. When a computer-readable medium disposed in any device runs on a computer, all or some of the steps in the embodiment corresponding to FIG. 8 may be implemented. A storage medium of the computer-readable medium may include: a magnetic disk, an optical disc, a read-only memory (read-only memory, ROM for short), a random access memory (random access memory, RAM for short), or the like.

In addition, another embodiment of this application further discloses a computer program product including instructions. When the computer program product runs on an electronic device, the electronic device is enabled to perform all or some of the steps in the embodiments corresponding to FIG. 2 and FIG. 4.

Correspondingly, another embodiment of this application further discloses a computer program product including instructions. When the computer program product runs on an electronic device, the electronic device is enabled to perform all or some of the steps in the embodiment corresponding to FIG. 8.

The various illustrative logical units and circuits described in embodiments of this application may implement or operate the described functions by using a general-purpose processor, a digital information processor, an application-specific integrated circuit (ASIC), a field-programmable gate array (FPGA) or another programmable logical apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. The processor may alternatively be implemented by a combination of computing apparatuses, such as a digital information processor and a microprocessor, a plurality of microprocessors, one or more microprocessors with a digital information processor core, or any other similar configuration.

Steps of the methods or algorithms described in embodiments of this application may be directly embedded into hardware, a software unit executed by a processor, or a combination thereof. The software unit may be stored in a RAM, a flash memory, a ROM, an EPROM, an EEPROM, a register, a hard disk, a removable magnetic disk, a CD- ROM, or a storage medium of any other form in the art. For example, the storage medium may connect to a processor, so that the processor can read information from the storage medium and write information into the storage medium. Optionally, the storage medium may alternatively be integrated into the processor. The processor and the storage medium may be disposed in an ASIC, and the ASIC may be disposed in UE. Optionally, the processor and the storage medium may be disposed in different components of the UE.

It should be understood that sequence numbers of the processes do not mean an execution sequence in various embodiments of this application. The execution sequence of the processes should be determined based on functions and internal logic of the processes, and should not be construed as any limitation on implementation processes of embodiments of this application.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedures or functions according to embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

For same or similar parts in embodiments in this specification, refer to these embodiments. Each embodiment focuses on a difference from other embodiments. Especially, apparatus and system embodiments are basically similar to a method embodiment, and therefore are described briefly. For related parts, refer to descriptions in the method embodiment.

A person skilled in the art may clearly understand that, the technologies in embodiments of the present invention may be implemented by software in addition to a necessary general hardware platform. Based on such an understanding, the technical solutions in embodiments of the present invention essentially or the part contributing to the conventional technology may be implemented in a form of a software product. The computer software product may be stored in a storage medium, such as a ROM/RAM, a magnetic disk, or an optical disc, and include several instructions for instructing a computer device (which may be a personal computer, a server, a network device, or the like) to perform the methods described in the embodiments or some parts of the embodiments of the present invention.

For same or similar parts in the embodiments of this specification, refer to each other. Especially, the apparatus embodiments disclosed in this application are basically similar to the method embodiment, and therefore are described briefly. For related parts, refer to descriptions in the method embodiment.

The foregoing descriptions are implementations of the present invention, but are not intended to limit the protection scope of the present invention.

What is claimed is:

1. A method comprising:
    transmitting, when needing to execute a first task, first information from an application to an operating system through a first application programming interface (API) corresponding to the first task, wherein the first information indicates the first task, and the first task is queued in a first task queue based on a current load level of the operating system and a type of the first task queue;
    transmitting a first request from the application to the operating system through a second API corresponding to the first task when the application does not obtain a first thread corresponding to the first task in a first time period after the first information is transmitted, wherein the first API is different than the second API;
    receiving, by the application, a feedback corresponding to the first request from the operating system;
    generating, by the application and after receiving the feedback, the first thread; and
    executing, by the application, the first task using the first thread.

2. The method of claim 1, further comprising:
    creating an idle thread based on the current load level of the operating system, wherein a first thread pool comprises the idle thread, and the idle thread is queued in a first target task queue based on a task type corresponding to the idle thread, a first priority of the first task queue, and a type of the first target task queue.

3. The method of claim 2, wherein:
    when the first target task queue comprises a serial task queue, the idle thread is queued to the serial task queue; or
    when the first target task queue comprises a parallel task queue, n idle threads in the first thread pool are queued to the parallel task queue based on a quantity of tasks in the parallel task queue, and wherein a maximum value of n is a quantity of tasks comprised in the parallel task queue.

4. The method of claim 2, further comprising:
    completing at least one task in the first target task queue; and
    subsequent to the completing:
        reclaiming, to the first thread pool, a thread allocated to the first target task queue; or
        destroying, the thread allocated to the first target task queue.

5. The method of claim 2, further comprising:
    when the first task queue comprises a second target task queue and the first thread pool does not comprise a thread used to execute a task in the second target task queue:
        creating a corresponding thread to be queued to the second target task queue,
        wherein the second target task queue is a second task queue having a second priority that is higher than a third priority, comprises a target task, or is the second task queue and comprises the target task.

6. The method of claim 2, wherein the first priority is based on at least one of:
second information that is of the at least one first task and that is from the application;
third information of the application, wherein the third information indicates at least one of: a first running platform for the application, whether the application is currently visible, whether a first function of the application is currently perceivable, or a first application frequency of the application;
a type of a task comprised in the first task queue; or
a waiting duration of the first task queue.

7. The method of claim 6, wherein:
when the third information indicates the first running platform system, a second priority of a second task queue of a second application is higher than a third priority of a third task queue of a third application, wherein a second running platform for the second application is a foreground and a third running platform for the third application is a background;
when the third information indicates whether the first application is currently visible, a fourth priority of a fourth task queue of a fourth application is higher than a fifth priority of a fifth task queue of a fifth application, wherein the fourth application is currently visible and the fifth application is currently invisible;
when the third information comprises whether the first function is currently perceivable, a sixth priority of a sixth task queue of a sixth application is higher than a seventh priority of a seventh task queue of a seventh application, wherein a second function of the sixth application is currently perceivable and a third function of the seventh application is not currently perceivable; or
when the third information comprises the first application frequency, an eighth priority of an eighth task queue of an eighth application is higher than a ninth priority of a ninth task queue of a ninth application, wherein second application frequency of the eighth application is higher than a third application frequency of the ninth application.

8. The method of claim 2, further comprising:
generating a quantity of target threads that are located in the first thread pool based on the current load level of the operating system, wherein in a first time period, at least one first application has an application frequency higher than a first threshold, and in the first time period a target thread has a frequency higher than a second threshold.

9. The method of claim 1, wherein the current load level of the operating system is based on at least one of an idle percentage of a processor running the operating system; a quantity of currently created threads; memory usage of the processor; or a read/write status of a memory of an electronic device on which the operating system is installed.

10. The method of claim 1, further comprising:
creating an idle thread based on the current load level of the operating system, wherein the idle thread is in a first thread pool, at least one second task to be executed by the operating system is queued in a corresponding second task queue, and the idle thread is queued in the second task queue based on a priority of the second task queue.

11. A non-transitory computer-readable storage medium having instructions that when executed by a processor execute a method comprising:
transmitting, when needing to execute a first task, first information from an application to an operating system through a first application programming interface (API) corresponding to the first task, wherein the first information indicates the first task, and the first task is queued in a first task queue based on a current load level of the operating system and a type of the first task queue;
transmitting a first request from the application to the operating system through a second API corresponding to the first task when the application does not obtain a first thread corresponding to the first task in a first time period after the first information is transmitted, wherein the first API is different than the second API;
receiving, by the application, a feedback corresponding to the first request from the operating system;
generating, by the application and after receiving the feedback, the first thread; and
executing, by the application, the first task using the first thread.

12. The non-transitory computer-readable storage medium of claim 11, wherein the method further comprises:
creating an idle thread based on the current load level of the operating system, wherein a first thread pool comprises the idle thread, and the idle thread is queued in a first target task queue based on a task type corresponding to the idle thread, a first priority of the first task queue, and a type of the first target task queue.

13. The non-transitory computer-readable storage medium of claim 11, wherein the method further comprises:
transmitting second information of the first task from the application to the operating system through the first API, wherein the second information indicates a priority of the first task.

14. A terminal apparatus, comprising:
a memory, configured to store program instructions; and
at least one processor coupled to the memory and configured to invoke and execute the program instructions to:
transmit, when needing to execute a first task, first information from an application to an operating system through a first application programming interface (API) corresponding to the first task, wherein the first information indicates the first task, and the first task is queued in a first task queue based on a current load level of the operating system and a type of the first task queue;
transmit a first request from the application to the operating system through a second API corresponding to the first task when the application does not obtain a first thread corresponding to the first task in a first time period after the first information is transmitted, wherein the first API is different than the second API;
receive, by the application, a feedback corresponding to the first request from the operating system;
generate, by the application and after receiving the feedback, the first thread; and
execute, by the application, the first task using the first thread.

15. The terminal apparatus of claim 14, wherein the executed program instructions are further to:
create an idle thread based on the current load level of the operating system, wherein a first thread pool comprises the idle thread, and the idle thread is queued in a first target task queue based on a task type corresponding to the idle thread, a first priority of the first task queue, and a type of the first target task queue.

16. The terminal apparatus of claim 15, wherein:
when the first target task queue comprises a serial task queue, the idle thread is queued to the serial task queue; or
when the first target task queue comprises a parallel task queue, n idle threads in the first thread pool are queued to the parallel task queue based on a quantity of tasks in the parallel task queue, and wherein a maximum value of n is a quantity of tasks comprised in the parallel task queue.

17. The terminal apparatus of claim 15, wherein the executed program instructions are further to:
complete at least one task in the first target task queue; and subsequent to the completing:
reclaim, to the first thread pool, a thread allocated to the first target task queue;
or
destroy the thread allocated to the first target task queue.

18. The terminal apparatus of claim 15, wherein the executed program instructions are further to:
when the first task queue comprises a second target task queue and the first thread pool does not comprise a thread used to execute a task in the second target task queue;
create a corresponding thread to be queued to the second target task queue,
wherein the second target task queue is a second task queue having a second priority that is higher than a third priority, comprises a target task, or is the second task queue and comprises the target task.

19. The terminal apparatus of claim 15, wherein the first priority is based on at least one of:
second information that is of the at least one first task and that is from the application;
third information of the application, wherein the third information indicates at least one of: a first running platform for the application, whether the application is currently visible, whether a first function of the application is currently perceivable, or a first application frequency of the application;
a type of a task comprised in the first task queue; or
a waiting duration of the first task queue.

20. The terminal apparatus of claim 19, wherein:
when the third information indicates the first running platform, a second priority of a second task queue of a second application is higher than a third priority of a third task queue of a third application, wherein a second running platform for the second application is a foreground and a third running platform for the third application is a background;
when the third information indicates whether the first application is currently visible, a fourth priority of a fourth task queue of a fourth application is higher than a fifth priority of a fifth task queue of a fifth application, wherein the fourth application is currently visible and the fifth application is currently invisible;
when the third information comprises whether the first function is currently perceivable, a sixth priority of a sixth task queue of a sixth application is higher than a seventh priority of a seventh task queue of a seventh application, wherein a second function of the sixth application is currently perceivable and a third function of the seventh application is not currently perceivable; or
when the third information comprises the first application frequency, an eighth priority of an eighth task queue of an eighth application is higher than a ninth priority of a ninth task queue of a ninth application, wherein a second application frequency of the eighth application is higher than a third application frequency of the ninth application.

* * * * *